United States Patent
Merckx et al.

(10) Patent No.: US 12,402,646 B2
(45) Date of Patent: Sep. 2, 2025

(54) PULSE SEED-BASED NON-DAIRY COMPOSITION AND ASSOCIATED METHODS

(71) Applicant: Katholieke Universiteit Leuven, Leuven (BE)

(72) Inventors: Wouter Merckx, Kumtich (BE); Mathijs Soogen, Leuven (BE); Ivo Roelants, Leuven (BE)

(73) Assignee: Katholieke Universiteit Leuven, Leuven (BE)

( * ) Notice: Subject to any disclaimer, the term of this patent is extended or adjusted under 35 U.S.C. 154(b) by 0 days.

(21) Appl. No.: 18/805,391

(22) Filed: Aug. 14, 2024

(65) Prior Publication Data
US 2025/0241344 A1    Jul. 31, 2025

(30) Foreign Application Priority Data
Apr. 12, 2024 (EP) .................................. 24169929

(51) Int. Cl.
| | |
|---|---|
| *A23G 9/42* | (2006.01) |
| *A23C 11/10* | (2021.01) |
| *A23L 11/00* | (2021.01) |
| *A23L 11/30* | (2016.01) |
| *A23L 11/50* | (2021.01) |

(52) U.S. Cl.
CPC ............. *A23L 11/35* (2016.08); *A23C 11/103* (2013.01); *A23L 11/01* (2016.08); *A23L 11/50* (2021.01)

(58) Field of Classification Search
CPC .......... A23L 11/35; A23L 11/01; A23L 11/50; A23C 11/103
USPC ........................................................... 426/46
See application file for complete search history.

(56) References Cited

U.S. PATENT DOCUMENTS

| | | | |
|---|---|---|---|
| 3,869,556 A | * | 3/1975 | Rockland ................ A23L 11/10 426/459 |
| 11,800,879 B2 | | 10/2023 | Kelkar et al. |
| 2013/0101703 A9 | | 4/2013 | Colavito |
| 2016/0309732 A1 | | 10/2016 | Gugger et al. |

(Continued)

FOREIGN PATENT DOCUMENTS

| | | | |
|---|---|---|---|
| CN | 107048207 A | * | 8/2017 |
| CN | 111712137 A | | 8/2024 |

OTHER PUBLICATIONS

Translation of CN-107048207-A (Year: 2017).*

*Primary Examiner* — Brent T O'Hern
(74) *Attorney, Agent, or Firm* — TraskBritt

(57) ABSTRACT

Methods of removing plant tone of starchy Fabaceae pulses are disclosed. The pulses are selected from chickpea (*Cicer arietinum*), yellow pea (*Pisum sativum*), common bean (*Phaseolus vulgaris*) and fava bean (*Vicia faba*), and can be hulled or de-hulled pulses, whole pulses, split pulses or chopped solids having a Feret diameter of 1 to 4 mm. The pulses are transformed in an emulsifying and emulsion stabilizing manner suitable for fermentation. The emulsion thereof may be used in fermented milk derivatives that have a desirable texture or form that melts or self-disintegrates in-mouth. To achieve these technical effects, the pulses are pretreated with an aqueous bicarbonate ($MHCO_3$) solution or bicarbonate/carbonate ($M_2CO_3$) solution of bicarbonate salt, bicarbonate salt and carbonate salt, or bicarbonate salt and hydroxide salt (MOH), wherein M is an alkali metal cation, and having a pH between pH 7 and 10, preferably between 7.5 and 10.

14 Claims, 12 Drawing Sheets

(56) References Cited

U.S. PATENT DOCUMENTS

2022/0192238 A1 6/2022 Smith et al.
2022/0346417 A1 11/2022 Gautier et al.
2023/0105903 A1 4/2023 Ikenaga

* cited by examiner

Day 3   Day 4   Day 38

Day 38

PULSE SEED-BASED NON-DAIRY COMPOSITION AND ASSOCIATED METHODS

PRIORITY CLAIM

The application claims the benefit under the Paris Convention and 35 U.S.C. § 119 to the following European Patent applications:
 EP 24154270.3 filed on Jan. 26, 2024,
 EP 24168781.3 filed on Apr. 5, 2024,
 EP 24169929.7 filed on Apr. 12, 2024, and
 EP 24171857.6 filed on Apr. 23, 2024,
 the contents of the entirety of each of which are incorporated herein by this reference.

TECHNICAL FIELD

The application relates generally to methods for removing plant tones (off flavors) from seed pulses (i.e., the edible seeds of plants in the legume family), the resulting products and compositions, and the benefits received therefrom.

BACKGROUND

Seed pulses such as starchy Fabaceae pulses selected from the group consisting of chickpea (*Cicer arietinum*), yellow pea (*Pisum sativum*), common bean (*Phaseolus vulgaris*) and fava bean (*Vicia faba*) are becoming popular due to their nutritional values. They unfortunately can however have off flavors or "tones" disagreeable to some.

A need exists for methods for removing disturbing plant tones from starchy Fabaceae pulses and to render such pulses functionalities to transform them with natural oils into stable non-dairy emulsions with a desired texture.

It is particularly a challenge to ferment such pulses to form fermented milk substitutes and water-continuous non-dairy foodstuffs having the desired texture, which are heat pasteurizable, stable when acidic, and can be dried as an instant powder that can be easily reconstituted in the dairy substitutes of desired textures.

These challenges have led to such pulses and their associated proteins to be underutilized even though a switch to using them is generally desirable. The development of higher processed plant-based products is essential for appealing to a wider consumer base and achieving market expansion, ultimately contributing to environmental sustainability.

One underappreciated benefit of switching to non-dairy proteins is that the switch can have a significant positive impact on environmental quality. For example, plant-based proteins are generally considered to be more environmentally sustainable compared to animal-derived proteins, especially from meat sources. Research indicates that replacing animal protein with plant-based protein in the diet can greatly alleviate the environmental impact of the food system. Such a shift could be crucial for reducing greenhouse gas emissions, pollution, land, and water usage associated with animal product production.

Plant-based foods have lower environmental impacts than animal-based foods, especially when considering the total weight or weight of the protein content.

Plant-based proteins offer a sustainable alternative to animal proteins, addressing both health and environmental concerns. Plant proteins can be used to replace animal proteins in food products, reducing the environmental impact of animal agriculture. Plant proteins have gained attention as viable substitutes for animal-based proteins due to their sustainable and healthy characteristics. Additionally, the environmental benefits of plant-based diets have been highlighted, with vegetable proteins performing better in terms of greenhouse gas emissions and other impact categories compared to animal products.

Furthermore, transitioning from animal to plant-based protein foods is seen as a way to enhance the sustainability of food production and agricultural systems. The high demand for sustainable protein sources, including plant-based options, is becoming increasingly crucial. Plant-based protein foods have been recognized for their potential to reduce greenhouse gas emissions, pollution, and land and water usage compared to animal products.

Transitioning from animal-based proteins to plant-based proteins would play a crucial role in reducing the environmental footprint of food production. By embracing plant-based protein sources, individuals can contribute to a more sustainable and environmentally friendly food system.

BRIEF SUMMARY

Described is a method for removing plant tones and off tones from starchy pulses. As described herein, such pulses are provided with functionalities to avoid including additives and separation of the different pulse items. They can thus be used to make, e.g., vegan dairy-like items suitable for fermentation, directly edible snacks, and fermented snacks with a unique mouth feel.

"Seed pulses" as used herein can be, e.g., hulled or de-hulled pulses whole pulses, split pulses or chopped solids thereof with a Feret diameter (Dmax) of 1 to 4 mm. The seed pulses are transformed in an emulsifying and emulsion stabilizing manner suitable for 1) fermentation of the emulsion of the seed pulse product into fermented milk derivatives with a desired texture or 2) for fermenting such hulled or de-hulled pulses, whole pulses, or split pulses into melt-in-mouth or self-disintegrating-in-mouth snacks or breakfast cereal analogues.

To achieve this, pulses are pretreated with an aqueous bicarbonate solution or bicarbonate/carbonate solution made of 1) bicarbonate salt ($MHCO_3$), or 2) of bicarbonate salt ($MHCO_3$) and carbonate salt ($M_2CO_3$), or 3) bicarbonate salt and hydroxide salt (MOH), wherein M is an alkali metal cation, and having a pH between pH 7 and 10, preferably between 7.5-10.

Disclosed is a method of manufacturing an acidic fermented colloidal dispersion or suspension from a pulse selected from the group consisting of chickpea, yellow pea, common bean, and fava bean as hulled or de-hulled pulses as whole pulses, as split pulses, or as chopped solids thereof with a Feret diameter (Dmax) of 1 to 4 mm, or a combination thereof. Such a method comprises subjecting the pulses to
 a process in which dry pulses are submersed for at least 30 minutes in a bicarbonate solution or bicarbonate/carbonate solution at a temperature in the range of 40 to 70° C., preferably 55-65° C.,
 removing the resultant aqueous bicarbonate salt solution containing the pulse flavor and off-tones from the pulse seeds or pulse seeds and seed coats,
 optionally, a process in which the pulse seeds or the pulse seeds and seed coats are immersed or fully submersed for a short period of 20 to 60 minutes in an aqueous solution of hydroxide salt (MOH) at a pH greater than 10, preferably 11, and yet more preferably above 11.5, wherein M is an alkali metal cation, and later removing the aqueous hydroxide salt (MOH) solution, a process of rinse washing the pulse seeds or pulse seeds and seed coats with water or immersing them in water for a period of 30 to 180 minutes at temperature between 2° and 65° C., or immersing for a period 10 to 30 minutes at a temperature between 65° C. and 90° C., a process of homogenizing the pulse mass from the previous steps with a natural oil and water into an emulsion, and a process of fermenting the emulsion with an added vegan ferment culture and, optionally, a vegan culture starter medium.

Also described is a fermented dairy substitute comprising or consisting essentially of a fermented mixture of 1) from 1 to 50 wt %, preferably 5 to 40 wt %, even more preferably 10 to 30 wt % of a natural oil; 2) from 3 to 20 wt % by dry weight of bicarbonate modified pulse selected from the group of the starchy Fabaceae pulses consisting of chickpea, yellow pea, common bean, and fava bean; and 3) wherein the composition has a pH of between 2.5 and 5.5.

Also disclosed is a process of manufacturing dry seed pulses, dry seed pulse halves, and/or seed pulse pieces that are in-mouth self-disintegrating, the process comprising: 1) hydrating pulse seeds in an aqueous bicarbonate solute or bicarbonate/carbonate solute, 2) removing the bicarbonate solute or bicarbonate/carbonate solute, 3) washing the pulse material, 4) fermenting the pulse material with, e.g., a lactic acid bacteria (LAB) starter culture and, optionally, any one fermentation starter culture selected from the group consisting of a bifidobacteria, a food yeast and a food mold or combination thereof, and 4) drying the pulse material.

Further disclosed is a fermented vegan water-continuous product comprising (or consisting essentially of) a fermented mixture of 1) from 1 to 50 wt %, preferably 5 to 40 wt %, more 10 to 30 wt % of a natural oil, and 2) from 3 to 20 wt % by dry weight of bicarbonate modified pulse selected from the group of the starchy Fabaceae pulses consisting of chickpea, yellow pea, common bean, and fava bean, and 3) wherein the composition has a pH of between 2.5 and 5.5.

Further applicability of the disclosure will become apparent from the Detailed Description given hereinafter. However, it should be understood that the drawings, Detailed Description and specific examples, while indicating preferred embodiments, are given by way of illustration only, since various changes and modifications within the spirit and scope of the disclosure will become apparent to those skilled in the art from this detailed description. It is to be understood that both the foregoing general description and the following detailed description are exemplary and explanatory only and are not restrictive of the disclosure, as claimed.

BRIEF DESCRIPTION OF THE SEVERAL VIEWS OF THE DRAWINGS

FIGS. 11A-C is a graphic display that for the dried products 1-10 wherein FIG. 11A shows the in-mouth self-disintegration in on a scale 1-9, FIG. 11B shows the taste intensity in a scale 1-5 and FIG. 11C) shows the plant taste tone in a scale 1-5 (see Table 2).

DETAILED DESCRIPTION

Figure 1:
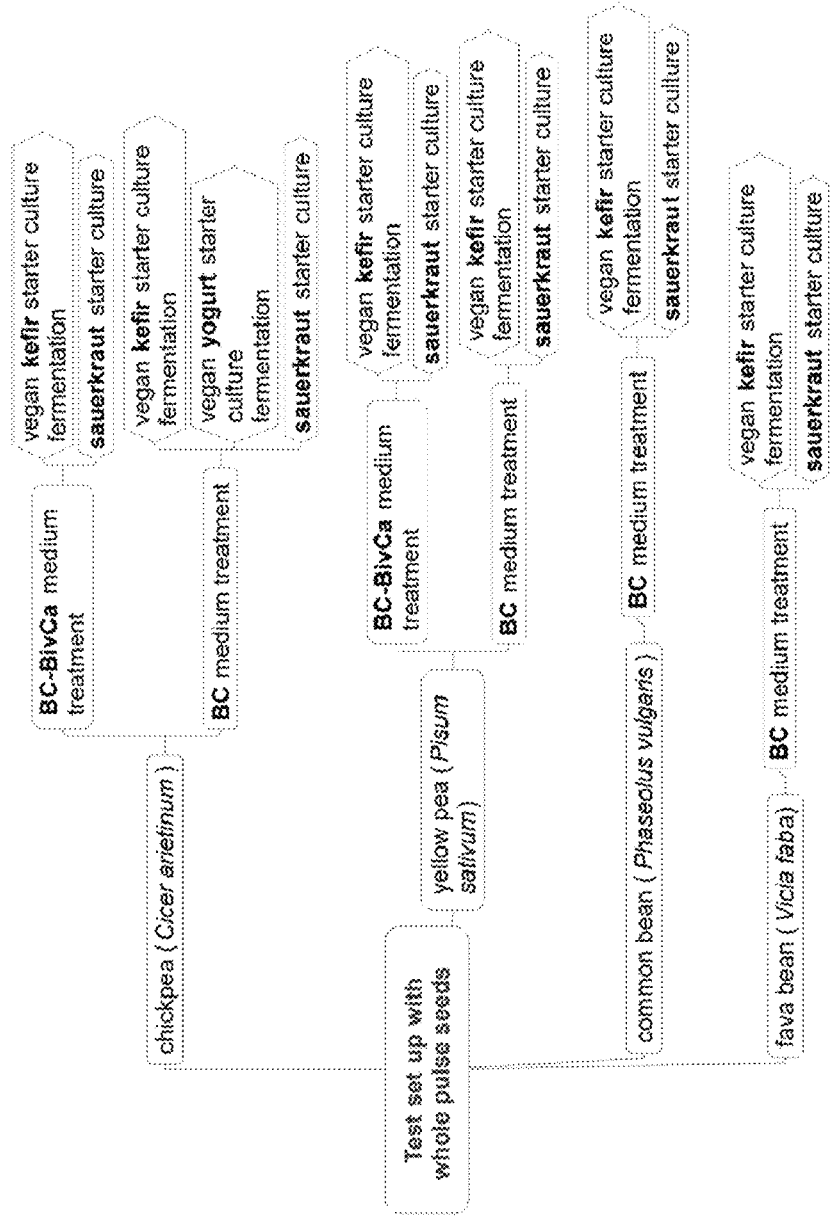
FIG. 1 is a flow chart depicting a whole pulse processing test.
Figure 2:
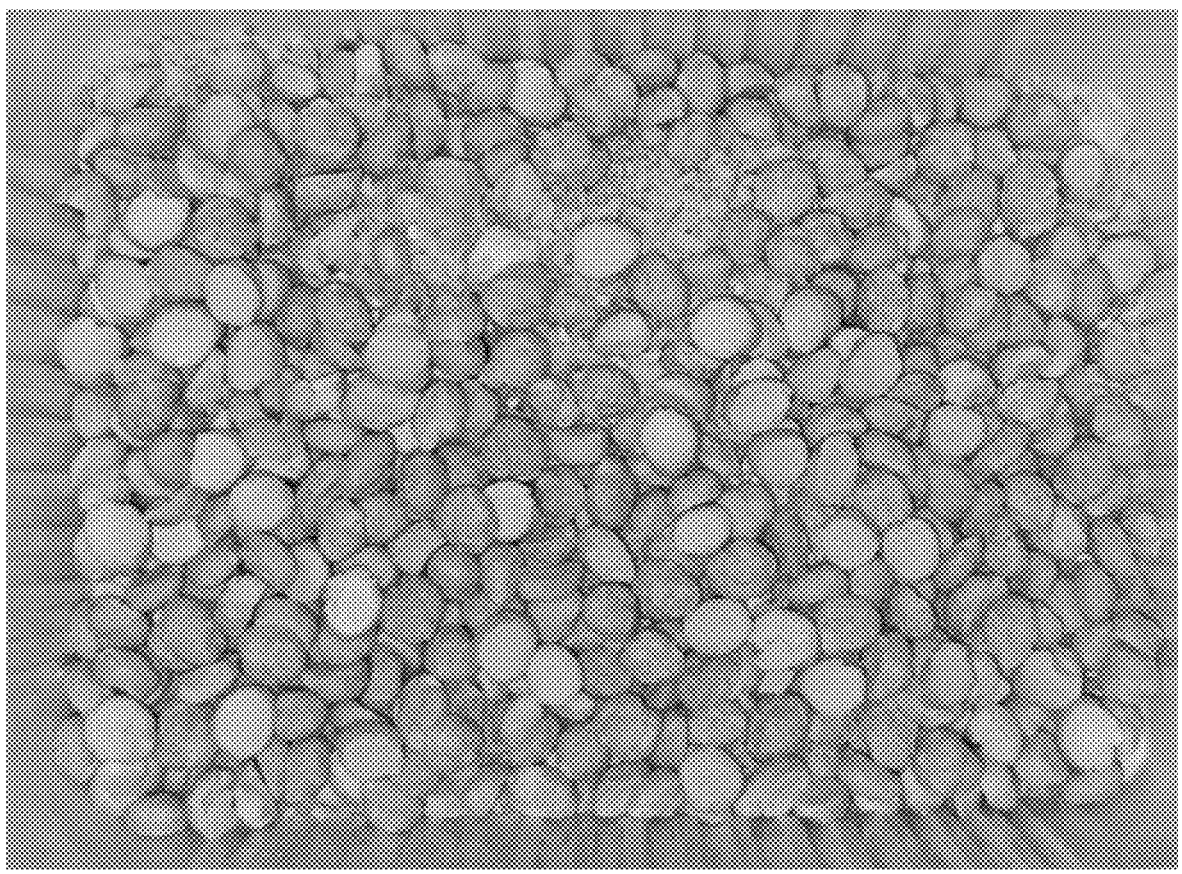
FIG. 2 is a photographic display of whole chickpeas that went through the process of the BC-BivCa medium treatment (Example 2) and consequently the fermentation treatment with the vegan kefir starter culture fermentation treatment (Example 4).
Figure 3:
FIG. 3 is a graphic display of whole pulse chickpeas that were subjected to the BC medium process (Example 1) and consequently the fermentation treatment with the vegan yogurt starter culture fermentation treatment (Example 4).
Figure 4:
FIG. 4 is a photographic display of whole yellow pea pulse that has been subjected to the process of the BC-BivCa medium treatment (Example 2) and consequently the fermentation treatment with the vegan kefir starter culture fermentation treatment (Example 4).
Figure 5:
FIG. 5 displays yellow peas that were subjected to the BC medium process (Example 1) and consequently the fermentation treatment with the vegan kefir starter culture fermentation treatment (Example 4).
Figure 6:
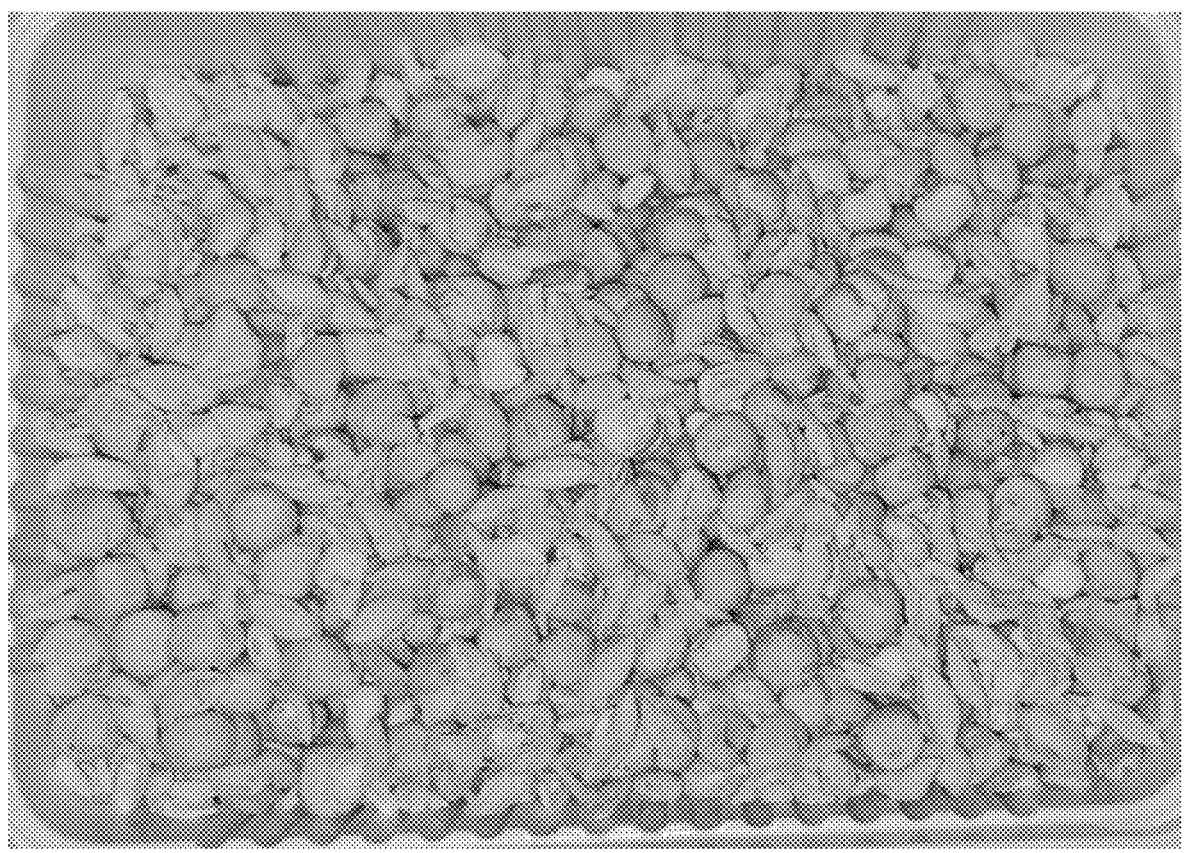
FIG. 6 displays whole pulse common bean that were subjected to the BC medium process (Example 1) and consequently the fermentation treatment with the vegan kefir starter culture fermentation treatment (Example 4).
Figure 7:
FIG. 7 is a photographic display of fava beans that were subjected to the BC medium process (Example 1) and consequently the fermentation treatment with the vegan kefir starter culture fermentation treatment (Example 4).
Figure 8:
FIG. 8 is a photograph of split or chopped pulse subjected to the process.

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, any relational term, such as "first," "second," "top," "bottom," "upper," "lower," "above," "beneath," "side," "upward," "downward," etc., is used for clarity and convenience in understanding the disclosure and accompanying drawings, and does not connote or depend on any specific preference or order, except where the context clearly indicates otherwise. For example, these terms may refer to an orientation of elements of any embodiment when utilized in a conventional manner. Furthermore, these terms may refer to an orientation of elements of any embodiment as illustrated in the drawings.

As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.).

"Bicarbonate modified pulse" means hulled whole pulses or de-hulled whole pulses, as split pulses or as chopped solids thereof with a Feret diameter (Dmax) of 1 to 4 mm) that have been modified by heating at temperatures within the range of 40° C. to 70° C., preferably within the range of 55° C. to 65° C. or for a short period of 15 to 30 minutes at a temperature in the range of 70° C. to 90° C., preferably 80-90° C., in a watery bicarbonate solute (an aqueous solution of a carbonic acid-bicarbonate-carbonate system). Such aqueous bicarbonate solution thus forms a carbonic acid-bicarbonate-carbonate equilibrium and can be made by dissolving a carbonate (e.g., a bicarbonate salt) in water. In this disclosure bicarbonate modified pulses have been made from starchy Fabaceae pulses selected from the group consisting of chickpea (*C. arietinum*), yellow pea (*P. sativum*), common bean (*P. vulgaris*) and fava bean (*V. faba*). Such pulse matter as hulled or de-hulled whole pulses, as split pulses or as chopped solids thereof with a Feret diameter (Dmax) of 1 to 4 mm have herein been fermented. Or they are (for fermentation) first mashed and homogenized in water or a watery fermentation starter medium.

A "water-continuous dairy product" refers to a product where water is the continuous phase, and other components are dispersed within it. In the context of dairy products, this would include products like yogurt, where water forms the continuous phase, and milk proteins, fats, and other components are dispersed within this aqueous phase. The colloidal nature of dairy products like yogurt, with casein aggregates suspended in the liquid phase, further supports the classification of such products as water-continuous colloidal dispersions. In the context of the disclosure this includes yogurt-like or yogurt analogue products, where water forms the continuous phase, and fermented pulse components are dispersed within this aqueous phase.

A "water-continuous non-dairy product" refers also to a product where water is the continuous phase, and other plant-based components are dispersed within it, and whereby water forms the continuous phase, and plant proteins, fats, and other plant components are dispersed within this aqueous phase. In particular, in the disclosure, the fermented pulse components are dispersed within this aqueous phase and water forms the continuous phase.

A "natural oil" as used herein can be a vegetable oil, a microbial oil, a plant-based oil, an algal oil, a fungal oil, an invertebrate oil and/or a vertebrate oil and it can be a food oil or a body oil.

"Food product" as used herein refers to any article or entity that can be consumed (e.g., eaten, drunk, ingested, transported, diffused, and/or injected) by an organism (e.g., animal, human, plant, or microbe) as a source of food.

The term "lipid" as used herein refers to a class of organic compounds that are characterized by having limited or no solubility in water. Non-limiting Examples of lipids include fats, oils, fatty acids, fatty acid derivatives, fatty acid esters, four-carbon and longer organic alcohols (e.g., butanol, butenol, pentanol, hexanol, etc.), four-carbon and longer organic aldehydes (e.g., butanal, butenal, pentanal, hexanal, etc.), natural oils, waxes, steroids, sterols, phytosterols, glycerides, monoglycerides, diglycerides, triglycerides, phospholipids, phosphatides, choline derived lipids, cerebrosides, hydrocarbons, and some fat-soluble vitamins (e.g., vitamins A, D, E and K). As used herein, a lipid may refer to either a single organic compound or to a mixture of organic compounds that are lipids as commonly observed in sources of lipids used in foods (e.g., canola oil is a lipid that comprises linoleic acid lipid, linolenic acid lipid, oleic acid lipid, etc.).

Non-limiting examples of organic acids suitable for use herein include acetic acid, citric acid, lactic acid, malic acid, propionic acid, sorbic acid, tartaric acid, ascorbic acid, fumaric acid and benzoic acid. Such acids have a preservation activity such as by killing harmful bacteria and to control or prevent the growth of bacteria and mold or as antioxidant (vitamin C). Such acids are available in encapsulated form in capsules formed by substance(s) from the group consisting of chitosan, alginate, maltodextrin, polyacrylates, and gelatin.

Non-limiting examples of lipids include algae oil, almond oil, aloe vera oil, apricot oil, avocado oil, baobab oil, calendula oil, canola oil, coconut oil, corn oil, cottonseed oil, evening primrose oil, flaxseed oil, grape seed oil, hazelnut oil, jojoba oil, linseed oil, macadamia oil, neem oil, olive oil, palm oil, peanut oil, rapeseed oil, rice bran oil, safflower oil, sesame oil, soybean oil, sunflower oil, synthetic oils, walnut oil, vegetable oil, high oleic oils, high oleic sunflower oil, high oleic safflower oil, berry wax, candelilla wax, carnauba wax, cocoa butter, illipe nut butter, Japan wax, jasmine wax, kokum butter, lemon peel wax, sal butter, mango butter, *Myrica* fruit wax, murumuru butter, orange peel wax, ouricury wax, rapeseed wax, rice bran wax, rose wax, shea butter, sumac wax, sunflower wax, sunflower seed wax, ucuuba butter, fractionated candelilla wax, fractionated carnauba wax, fractionated cocoa butter, fractionated coconut oil, fractionated mango butter, fractionated palm oil, fractionated rice bran oil, fractionated rice bran wax, fractionated shea butter, palm stearin, shea stearin, rice bran stearin, cocoa stearin, hydrogenated canola oil, hydrogenated corn oil, hydrogenated cottonseed oil, hydrogenated flaxseed oil, hydrogenated grape seed oil, hydrogenated palm oil, hydrogenated peanut oil, hydrogenated rapeseed oil, hydrogenated rice bran oil, hydrogenated safflower oil, hydrogenated sesame oil, hydrogenated soybean oil, hydrogenated sunflower oil, hydrogenated vegetable oil fish oil, Atlantic fish oil, Pacific fish oil, Mediterranean fish oil, bonito oil, pilchard oil, tuna oil, sea bass oil, halibut oil, spearfish oil, barracuda oil, cod oil, menhaden oil, sardine oil, anchovy oil, capelin oil, Atlantic cod oil, Atlantic herring oil, Atlantic mackerel oil, Atlantic menhaden oil, salmon oil, shark oil, squid oil, cuttle fish oil, octopus oil, krill oil, seal oil, and whale oil. Preferably, the lipid is selected from the group consisting of algae oil, aloe vera oil, avocado oil, canola oil, coconut oil, corn oil, cottonseed oil, flaxseed oil, grape seed oil, olive oil, palm oil, peanut oil, rapeseed oil, rice bran oil, safflower oil, sesame oil, soybean oil, sunflower oil, high oleic sunflower oil, high oleic safflower oil, berry wax, candelilla wax, carnauba wax, cocoa butter, illipe nut butter, Japan wax, jasmine wax, kokum butter, lemon peel wax, mango butter, *Myrica* fruit wax, ouricury wax, rapeseed wax, rice bran wax, shea butter, sumac wax, sunflower wax, fractionated coconut oil, fractionated palm oil, fractionated rice bran oil, palm stearin, shea stearin, rice bran stearin, cocoa stearin, animal fat, beef fat, tallow, pork fat, lard, or fish oil.

Lipids can be classified into two main groups: simple lipids and complex lipids. Simple lipids are made up of only one type of molecule, while complex lipids are made up of two or more types of molecules. Simple lipids include fats, oils and waxes. Fats are the most common type of lipid. They are made up of a glycerol molecule bonded to three fatty acid molecules. Oils are similar to fats, but they have a lower melting point since oils have shorter chain fatty acids. Waxes are made up of a long-chain fatty acid bonded to a long-chain alcohol. They are often found on the surface of plants and animals. Complex lipids comprise phospholipids, glycolipids and steroids: Steroids are a type of lipid that is made up of four fused rings of carbon atoms. They include hormones such as testosterone and estrogen, as well as cholesterol. Phospholipids are the main component of cell membranes. They are made up of a glycerol molecule bonded to two fatty acid molecules and a phosphate group. Glycolipids are a type of lipid that contains a carbohydrate molecule. They are often found on the surface of cells, where they help to identify the cell and its function. Steroids are a type of lipid that is made up of four fused rings of carbon atoms. They include hormones such as testosterone and estrogen, as well as cholesterol.

The term "dry" or "dried" referring to a food component or food ingredient means that the water content has been significantly reduced from the original form of the food. This is typically achieved through processes like dehydration, which removes water from the food by evaporation or other methods. The amount of moisture left in a dry food powder can vary depending on the specific type of food and the drying method used. It is interpreted to have a moisture content under 12%, preferably under 10%, 7%, a moisture content of around 5%, or even having a moisture content of around 3%.

"Butter" as used herein is understood to be synonymous with the term "lipid" and may refer in general terms to a lipid or a composition comprising a lipid as a main constituent that retains solid, semi-solid, biphasic, or paste-like properties at ordinary temperatures of use.

"Vegetable oil" refers to oil extracted from a vegetable material or any non-animal organism. The method of oil extraction is not particularly limited and is selected according to the plant material. The type of vegetable oil is not limited, but examples thereof include safflower oil, coconut oil, palm oil, palm kernel oil, soybean oil, rapeseed oil, olive oil, corn oil, processed oil and fat (obtained by processing vegetable oil), and the like. Safflower oil, coconut oil, and palm oil are preferred, particularly safflower oil, which makes it difficult to detect off tastes. Oils is understood to comprise oil from plant, algae, yeast, and non-animal organisms and such may comprise edible oils or may comprise body oils, oil that may contact human body are commonly called body oils including coconut oil, jojoba oil, avocado oil, argan oil and sweet almond oil.

"Animal oil" refers to oil extracted from an animal material. The method of oil extraction is not particularly limited and is selected according to the animal material.

The term "additive" as used herein means a compound the intended use of which results or may reasonably be expected to result, directly or indirectly, in affecting the characteristics of any composition.

"Colloidal" is a type of colloid made from finely ground solid material. The solid material is ground into a very fine powder, which is then suspended in the liquid. The particles of the solid are so small that they cannot be seen with the naked eye in the colloidal mixture of the ground solid in the fluid. On the other hand, if a solid is in suspension but not considered colloidal ("coarse suspension" or "non-colloidal suspension"), it implies that the particles are larger than those typically found in colloids. Colloids are characterized by finely divided particles, often on the nanometer scale, that remain dispersed in a medium (such as a liquid or gas) for an extended period. In contrast, if the solid particles in suspension are larger and do not exhibit the stable, long-term dispersion associated with colloids, it would be described as a suspension of larger particles.

Advanced oxidation processes (AOPs) utilize highly reactive oxidizing agents to decompose and mineralize organic contaminants. Hydroxyl radicals (OH·) are the primary oxidizing species in AOPs, known for their exceptional reactivity and ability to break down even the most complex organic molecules. They are generated through the synergistic combination of different oxidizing agents, including hydrogen peroxide ($H_2O_2$), ozone ($O_3$), and ultraviolet (UV) radiation. Hydrogen peroxide is a powerful oxidizing agent that can directly attack organic compounds, breaking down their chemical bonds. It is a non-selective oxidant, meaning it can oxidize a wide range of organic molecules. However, $H_2O_2$ alone is not as effective in mineralizing organic compounds as AOPs involving other oxidizing agents. Ozone ($O_3$) is a highly reactive gas with a strong oxidative capacity. It can break down organic compounds through direct oxidation reactions, but it is also known to generate hydroxyl radicals through a process called photolysis. Photolysis occurs when UV radiation interacts with ozone molecules, breaking them down into oxygen molecules and highly reactive oxygen atoms. These oxygen atoms then combine with water molecules to form hydroxyl radicals. UV radiation (UV), specifically UV-A and UV-B wavelengths, can directly excite water molecules, causing them to emit hydroxyl radicals. These radicals can then attack organic compounds, leading to their decomposition. The synergistic combination of $H_2O_2$, ozone, and UV radiation in AOPs leads to the production of a large number of hydroxyl radicals. These highly reactive radicals attack organic compounds, breaking down their chemical bonds and converting them into simpler, more stable products. The mineralization process ultimately leads to the formation of carbon dioxide, water, and inorganic salts, essentially transforming organic contaminants into harmless by-products. Advanced oxidation of salt solutions (AOASS) effectively degrades a wide range of organic plant aromas and off tones, by a salt solution through a series of reactors where it is exposed to a combination of $H_2O_2$, ozone, and UV radiation. The hydroxyl radicals (OH·) produced by these reactions attack the organic contaminants, breaking them down into smaller molecules and ultimately to carbon dioxide and water. Clean salts can then be recovered from the treated solution by evaporation or crystallization.

Dry processes are able to produce particles optimized for molecule extraction, mixing with other ingredients, enriching the product in a compound (e.g., proteins, starch, etc.). The particle size is the main parameter to be adjusted and three categories are generally described: Coarse milling (>500 μm), fine milling (50-500 μm), and ultrafine milling (<50 μm). The particle size and shape are therefore important parameters to be adjusted specifically considering the application, the resources concerned and the economical balance of the process. A suitable system for dry milling of the bicarbonate treated and dried legume seeds is, for instance, milled into grits with a pin mill (LV 15 M Condux-Werk, Wolfgang bei Hanau, DE) and subsequently the coarse grits can further be milled into flour with a ZPS50 impact mill (Hosokawa-Alpine, Augsburg, DE) at ambient temperature. An ATP50 air-classifier (Hosokawa-Alpine) at ambient temperature can be used to separate protein-rich fine fractions. For instance, with the classifier wheel speed of the ATP50 air-classifier set at 10,000 rpm and the airflow kept constant at 52 m³/h and the feed rate was ~0.5 kg/h. The powder generated can be treated by air classifying that provides a cut point of a few micrometers or by electrostatic separation that separate particle according to their electrostatic charges and consequently their composition. Electrostatic separators can be classified by the method of charging employed. The three basic types of electrostatic separators include: (1) high tension roll (HTR) ionized field separators, (2) electrostatic plate (ESP) and screen static (ESS) field separators and (3) triboelectric separators, including belt separator systems (BSS).

A "Firm/Set" firmness is comparable with a yogurt with a solid structure that holds its shape well. One can easily cut through it with a knife without it crumbling apart.

A "Soupy/Runny" texture is drinking yogurt-like. It is very loose and flows freely. One can easily drink it straight from the container like a kefir or buttermilk for a good comparison.

A "Thick/Creamy" texture is comparable to that yogurt that has a thicker consistency and moves slowly when poured. It is spoonable, but the spoon will not necessarily stand upright on its own in such yogurt. A heavy cream or Greek yogurt is a good reference point for comparison.

A "Set/Wobbly but Spoonable" texture is comparable with that of a custard yogurt or quark. It finds a middle ground between firm and runny. It holds its shape somewhat like a mold but wobbles if jiggled. One can easily spoon it.

Disclosed are stable water-continuous non-dairy products that have any or all of the following desirable technical effects 1) they are stable at an acidic pH, for instance, between 3 and 4.8, 2) they remain stable during heat pasteurization, for instance, at temperatures between 8° and 95° C. or even shortly during boiling, 3) that are obtainable after fermentation by a vegan ferment starter, 4) that can be free of animal derived ingredient or free of any stabilizer compound or viscosity increasing additive compound of the group consisting of xanthan gum, carob gum, guar gum, methylcellulose, carrageenan and carboxymethylcellulose, and 5) that can be dried and reconstituted in a water-continuous non-dairy product.

The disclosure is predicated on the discovery as described herein that all these additives can be avoided by processing hulled or de-hulled starchy Fabaceae pulses selected from the group consisting of chickpea (*C. arietinum*), yellow pea (*P. sativum*), common bean (*P. vulgaris*) and fava bean (*V. faba*) pulses as whole, split or chopped solids into to emulsifying and emulsion stabilizing compositions. Provided is a method for making water-continuous non-dairy product that, for instance, are free of animal derived ingredient and do not comprise stabilizer compound or viscosity increasing additive compound of the group consisting of xanthan gum, carob gum, guar gum, methylcellulose, carrageenan and carboxymethylcellulose based on this processed starchy Fabaceae pulses selected from the group consisting of chickpea (*C. arietinum*), yellow pea (*P. sativum*), common bean (*P. vulgaris*), and fava bean (*V. faba*) material.

Described is a method of converting whole starchy Fabaceae pulses from the group consisting of chickpea (*C. arietinum*), yellow pea (*P. sativum*), common bean (*P. vulgaris*) and fava bean (*V. faba*) pulses into emulsifying or emulsion stabilizing composition that is used make an emulsion with a natural oil, to inoculate this with a vegan ferment culture for fermentation in a water-continuous non-dairy product. The method comprises 1) immersing hulled or de-hulled pulses as whole, split or chopped solids in an aqueous solution of a carbonic acid-bicarbonate-carbonate system, 2) providing thermal energy into the system and maintaining the pH above 7 to shift the equilibrium in the carbonic acid-bicarbonate-carbonate system towards carbonate ions and this at a temperature and pH keeping the starchy Fabaceae pulses seed material solid and using this processed pulse matter as a feedstock for fermentation by a vegan ferment culture. The method provides a way to have such carbonic acid-bicarbonate-carbonate systems made by alkali metal salt. It is also desirable to have the total dissolved solids (TDS) of the aqueous solution of the carbonic acid-bicarbonate-carbonate system in a range of 10 to 100 grams per liter. The pulse product resulting from this process is substantially freed of the typical plant flavors and can easily be converted by mixing under a proper force with water and oil into a stable emulsion. It was observed that fermentation of emulsion with a vegan ferment culture converts the emulsified mass in a stable water-continuous non-dairy product with a yogurt feel.

These embodiments of the disclosure advantageously use a carbonic acid-bicarbonate-carbonate system. This can be a solute comprising sodium bicarbonate ($NaHCO_3$) and or sodium carbonate ($Na_2CO_3$) or a combination thereof or that the carbonic acid-bicarbonate-carbonate system by a solute comprising potassium bicarbonate ($KHCO_3$) or potassium carbonate ($K_2CO_3$) or a combination thereof and when a base is used that this is alkali metal hydroxide, for instance, wherein the alkali metal is sodium or wherein the alkali metal is potassium. The added base can be alkalis is selected from the group consisting of sodium hydroxide, potassium hydroxide, calcium hydroxide and magnesium hydroxide.

It was found that the moist pulses treated with BC-BvCa medium of a water solution of sodium bicarbonate (comprising also zinc and iron catalyst and bivalent ions such as Ca++ or Mg++) were (see Table 4) firmer texture after the same heating and time that the pulses treated by the BC medium (a water solution of only sodium bicarbonate). However, when these pulse matters were subjected to fermentation by a vegan ferment, it was observed that the fermented BC-BvCa medium treated pulses became softer than fermented BC-medium treated pulses and this for the same fermentation conditions. Some of the techniques described above may be embodied as the transformation of the starchy Fabaceae pulses in an emulsifying or emulsion stabilizing composition according to the methods described herein is with a carbonic acid-bicarbonate-carbonate system comprising a zinc and/or iron catalyst or bivalent ions such as Ca++ or Mg++ to speed up the reaction and to lower activation energy.

Some of the techniques described herein may be embodied as the transformation of the starchy Fabaceae pulses in an emulsifying or emulsion stabilizing composition according to the methods described herein is with a carbonic acid-bicarbonate-carbonate system comprising a zinc and/or iron catalyst and bivalent ions such as Ca++ and Mg++ to speed up the reaction and to lower activation energy.

Furthermore, it was observed that the dried pulses treated with BC-BvCa medium of a water solution of sodium bicarbonate (comprising also zinc and iron catalyst and bivalent ions such as Ca++ or Mg++) and subjected with fermentation by a vegan ferment were more self-integrating-in-mouth than dried pulses that were treated the same way in terms of heat input and treatment time but with the BC medium (a water solution of only sodium bicarbonate). Some of the techniques described above may be embodied as the transformation of the selected dried starchy Fabaceae pulse(s) into a snack of pulses or cereal analogues according to the methods described herein with a carbonic acid-bicarbonate-carbonate system or with a carbonic acid-bicarbonate-carbonate system comprising a zinc and/or iron catalyst or bivalent ions such as Ca++ or Mg++ to speed up the reaction and to lower activation energy.

Surprisingly, while the treatment with BC-BvCa medium (a water solution of sodium bicarbonate (also comprising zinc and iron catalyst and bivalent ions such as Ca++ or Mg++)) resulted in softer, moist pulses (obtained after a substantial washing step), when these pulses were homogenized with a natural oil (canola oil) and stored for 24 hours in a refrigerator, this treatment resulted in a running drink yogurt-like texture, while the BC medium (a water solution of only sodium bicarbonate) with the same physical treatment resulted in a thick/creamy Greek or Bulgarian yogurt-like texture. And, for instance, a BC medium plus magnesium chloride with the same physical treatment resulted in a set/wobbly but spoonable texture comparable with that of a custard yogurt or quark.

Yet further surprisingly, when these homogenized and emulsified masses were subjected to a vegan ferment culture fermentation, the BC-BvCa medium (a water solution of sodium bicarbonate (also comprising zinc and iron catalyst and bivalent ions such as Ca++ or Mg++) treated pulse, independent of the vegan ferment, resulted in a set/wobbly texture and custard yogurt/quark/cottage cheese-like vegan fermented product. The general tendency was that pretreatment of the pulse with a BC medium plus a bivalent ion (Ca++, Mg++ or Fe++ and Zn++) resulted after fermentation in a firmer yogurt or cheese-like structure than with the pretreatment by a CM medium alone.

In one embodiment, this pre-treatment processing of the selected starchy Fabaceae pulses is carried out in an air-tight reaction vessel. In another embodiment of the disclosure, the processing of the selected starchy Fabaceae pulse(s) is carried out in an open reaction vessel.

In a practical embodiment, the process comprises discharging the aqueous solution of the carbonic acid-bicarbonate-carbonate system or the selected starchy Fabaceae pulse(s) s material from the reaction vessel, and treating the selected starchy Fabaceae pulse(s)) material by a wash step and, optionally, thereby regenerating carbonic acid-bicarbonate-carbonate system.

By using a system as described herein, it is possible to obtain as reaction product an emulsifying or emulsion stabilizing the selected starchy Fabaceae pulse(s) composition and to have this in a homogenized paste form.

Another embodiment is an emulsifying or emulsion-stabilizing the selected starchy Fabaceae pulse(s) composition obtained by the process of the disclosure but that is dried and grinded in a micronized dry form.

Yet another embodiment is emulsifying or emulsion stabilizing with a natural oil of the selected starchy Fabaceae pulse(s) composition obtained by the process of the disclosure and consequently fermented, dried and ground into a micronized dry form. It has surprisingly been observed that such dry micronized powder of the composition can instantly be reconstituted with water in a non-dairy or vegan type yogurt analogue.

In view of the foregoing discussion, the examples, figures and following discussion, the application also provides aspects and embodiments as set forth in the following Statements (1' to 11') directly below:

Statement 1' A process for manufacturing dry seed pulses, dry seed pulse halves or seed pulse pieces that are in-mouth self-disintegrating, the process comprising the steps of 1) hydrating the pulse seeds in an aqueous bicarbonate solute or bicarbonate/carbonate solute, 2) removing the bicarbonate solute or bicarbonate/carbonate solute, 3) washing the pulse material, 4) fermenting the pulse material with a lactic acid bacteria (LAB) starter culture and, optionally, any one fermentation starter culture of the groups consisting of a bifidobacteria, a food yeast and a food mold or combination thereof and 4) drying the pulse material.

Statement 2' The process according to statement 1' whereby in step 1) the pulses are submersed for at least 30 minutes in the bicarbonate solute or bicarbonate/carbonate solute at a temperature in the range of 40 to 70° C., preferably 55-65° C. or for a short period of 15 to 30 minutes at a temperature in the range of 70° C. to 90° C., preferably 80-90° C.

Statement 3' The process according to statement 1' whereby in step 1) the pulses are submersed for at least 30 minutes in the bicarbonate solute or bicarbonate/carbonate solute at a temperature in the range of 40 to 70° C., preferably 55-65° C. and the solute has a pH lower than 10 or for a short period of 15 to 30 minutes at a temperature in the range of 70° C. to 90° C., preferably 80-90° C. and the solute has a pH lower than 10.

Statement 4' The process of any one of statements 1' to 3', further comprising the step 5) packaging the in-mouth self-disintegrating dry seed pulses, dry seed pulse halves or seed pulse pieces.

Statement 5' The process of any one of statements 1' to 4', wherein the pulse selected from the group consisting of chickpea (*C. arietinum*), yellow pea (*P. sativum*), common bean (*P. vulgaris*) and fava bean (*V. faba*), or a combination thereof.

Statement 6' The process of any one of statements 1' to 5', wherein the lactic acid bacteria (LAB) is selected from the group consisting of *Lactobacillus acidophilus, Lactobacillus bulgaricus, Lactobacillus casei, Lactobacillus delbrueckii* subsp. *Bulgaricus, Lactobacillus helveticus, Lactobacillus paracasei, Lactobacillus plantarum, Lactobacillus rhamnosus, Lactococcus lactis* (and its subspecies, optionally, *Lactococcus lactis* subsp. *Cremoris, Lactococcus lactis* subsp. Diacetylactis or *Lactococcus lactis* subsp. *Lactis*), *Leuconostoc mesenteroide* and *Streptococcus thermophiles*, or a combination thereof.

Statement 7' The process of any one of statements 1' to 5', wherein the bifidobacteria is selected from the group consisting of *Bifidobacterium animalis* spp. *Lactis, Bifidobacterium bifidum, Bifidobacterium lactis* and *Bifidobacterium breve*, or a combination thereof.

Statement 8' The process of any one of statements 1' to 5', wherein the food yeast is *Saccharomyces cerevisiae*.

Statement 9' The process of any one of statements 1' to 5', wherein the food mold is *Aspergillus oryzae*.

Statement 10' The process of any one of statements 1' to 9', wherein the aqueous bicarbonate solution or bicarbonate/carbonate solution comprises additionally $CaCl_2$) to prevent or inhibit material loss from the pulses under treatment in the solution.

Statement 11' The process of any one of claims 1' to 10', whereby elimination unwanted accompanying fragrance and/or flavor, in particular, removing or reducing pulse flavor or beany flavor.

Statement 12' In-mouth self-disintegrating dry seed pulse food, manufactured by any one of the processes of Statements 1' to 11'.

In view of the foregoing discussion, the examples, figures and following discussion, the present application also provides aspects and statements as set forth in the following Statements (1" to 15") directly below:

Statement 1" A fermented dairy substitute, comprising or consisting essentially of a fermented mixture of 1) from 1 to 50 wt %, from 5 to 40 wt %, or from 10 to 30 wt % of a natural oil and 2) from 3 to 60 wt %, from 4 to 59%, from 5 to 40%, from 6 to 30% or from 7 to 20% by dry weight of bicarbonate modified pulse selected from the group of the starchy Fabaceae pulses consisting of chickpea (*C. arietinum*), yellow pea (*P. sativum*), common bean (*P. vulgaris*) and fava bean (*V. faba*) and 3) wherein the composition has a pH of between 2.5 and 5.5.

Statement 2" The fermented dairy substitute of statement 1", characterized in that it is a yogurt substitute, Quarg substitute, Kefir substitute, Koumiss substitute, fermented milk substitute, Skyr substitute, Viili substitute, Kurut substitute or a curd substitute.

Statement 3" The fermented composition of statement 1" or 2", wherein the composition does not comprise egg-derived emulsifier.

Statement 4" The fermented composition of statement 1" or 2", wherein the composition is free of an additional surface-active emulsifier additive.

Statement 5" The fermented composition of statement 1" or 4", wherein the composition does not comprise an additive selected from the group consisting of mono- and diglycerides, polysorbates, carrageenan, guar gum, xanthan gum, carob gum, modified waxy maize starch, modified waxy potato starch, carboxymethylcellulose and methylcellulose.

Statement 6" The fermented composition of statement 1" or 5", wherein the natural oil is a vegetable oil, a microbial oil, a plant-based oil, a seed oil, an algal oil, a fungal oil, an invertebrate oil and/or a vertebrate oil.

Statement 7" The fermented composition of statement 1" or 6", wherein the natural oil is a food oil or a body oil.

Statement 8" The fermented composition of any one of statements 1" to 7", wherein the bicarbonate modified pulse is an in-bicarbonate water slow-cooked pulse.

Statement 9" The fermented composition of any one of statements 1" to 8", wherein the fermented dairy substitute is fermented into a colloidal dispersion.

Statement 10" The fermented composition of any one of statements 1" to 8", wherein the fermented dairy substitute is fermented into a colloidal dispersion without the addition of hydrocolloids-like gums.

Statement 11" The fermented composition of any one of statements 1" to 8", characterized in that it is a water-continuous non-dairy product.

Statement 12" The fermented composition of any one of statements 1" to 8", wherein the fermented dairy substitute is fermented into a colloidal dispersion with the microstructure of a fermented dairy.

Statement 13" The fermented composition of any one of statements 1" to 8", wherein the fermented dairy substitute is fermented into a colloidal dispersion giving the characteristic properties of a fermented dairy.

Statement 14" The fermented composition of any one of statements 1" to 8", wherein the fermented dairy substitute is fermented into an in-liquid phase suspended aggregate forming a network giving its characteristic properties of a fermented dairy.

Statement 15" The fermented composition of any one of statements 1" to 8", wherein the fermented dairy substitute is fermented into an in-liquid phase suspended aggregate forming a network giving its texture, consistency, and stability.

In view of the foregoing discussion, the examples, figures and following discussion, the present application also provides aspects and embodiments as set forth in the following Statements (1* to 15*) directly below:

Statement 1* A fermented vegan water-continuous product, comprising (consisting essentially of) a fermented mixture of 1) from 1 to 50 wt %, or from 5 to 40 wt %, or from 10 to 30 wt % of a natural oil and 2) from 3 to 60 wt %, or from 4 to 50 wt %, or from 5 to 40 wt %, or from 6 to 30 wt %, or from 7 to 20 wt % by dry weight of bicarbonate modified pulse selected from the group of the starchy Fabaceae pulses consisting of chickpea (*C. arietinum*), yellow pea (*P. sativum*), common bean (*P. vulgaris*) and fava bean (*V. faba*) and 3) wherein the composition has a pH of between 2.5 and 5.5.

Statement 2* The fermented composition of statement 1*, wherein the composition is free of unwanted accompanying fragrance and/or flavor, such as free of pulse flavor or beany flavor.

Statement 3* The fermented composition of statement 1* or 2*, wherein the composition does not comprise egg-derived emulsifier.

Statement 3* The fermented composition of statement 1* or 3*, wherein the composition is free of an additional surface-active emulsifier additive.

Statement 5* The fermented composition of statement 1* or 4*, wherein the composition does not comprise an additive of the group consisting of mono- and diglycerides, polysorbates, carrageenan, guar gum, xanthan gum, carob gum, modified waxy maize starch, modified waxy potato starch, carboxymethylcellulose and methylcellulose.

Statement 6* The fermented composition of statement 1* or 5*, wherein the natural oil is a vegetable oil, a microbial oil, a plant-based oil, a seed oil, an algal oil and/or a fungal oil.

Statement 7* The fermented composition of statement 1* or 5*, wherein the natural oil is a food oil or a body oil.

Statement 8* The fermented composition of any one of statements 1* to 7*, wherein the bicarbonate modified pulse is an in-bicarbonate water slow-cooked pulse.

Statement 9* The fermented composition of any one of statements 1* to 8*, wherein the fermented dairy substitute is fermented into a colloidal dispersion.

Statement 10* The fermented composition of any one of statements 1* to 8*, wherein the fermented dairy substitute is fermented into a colloidal dispersion without the addition of hydrocolloids-like gums.

Statement 11* The fermented composition of any one of statements 1* to 10*, characterized in that it is a water-continuous non-dairy product.

Statement 12* The fermented composition of any one of statements 1* to 10*, wherein the fermented dairy substitute is fermented into a colloidal dispersion with the microstructure of a fermented dairy.

Statement 13* The fermented composition of any one of statements 1 to 10*, wherein the fermented dairy substitute is a colloidal dispersion giving the characteristic properties of a fermented dairy.

Statement 14* The fermented composition of any one of statements 1 to 10*, wherein the fermented dairy substitute is an in-liquid phase suspended aggregate forming a network giving its characteristic properties of a fermented dairy.

Statement 15* The fermented composition of any one of statements 1 to 10*, wherein the fermented dairy substitute is an in-liquid phase suspended aggregate forming a network giving its texture, consistency, and stability.

In view of the foregoing discussion, the examples, figures and following discussion, the application also provides aspects and embodiments as set forth in the following Statements (1° to 12°) directly below:

Statement 1° A method of manufacturing acidic fermented colloidal dispersions or suspensions from a pulse selected from the group consisting of chickpea (C. arietinum), yellow pea (P. sativum), common bean (P. vulgaris) and fava bean (V. faba) as whole pulses (hulled or de-hulled pulses), as split pulses or as chopped solids thereof with a Feret diameter (Dmax) of 1 to 4 mm, or a combination thereof, the method comprising subjecting the pulses to:
- a process in which dry pulses are submersed for at least 30 minutes in the bicarbonate solution or bicarbonate/carbonate solution at a temperature in the range of 40 to 70° C., preferably 55-65° C. or for a short period of 15 to 30 minutes at a temperature in the range of 70° C. to 90° C., preferably 80-90° C.
- a process of removing the aqueous bicarbonate salt solution with pulse flavor and off-tones from the pulse seeds or from the pulse seeds and seed coats.
- optionally, a process in which the pulse seeds or the pulse seeds and seed coats are immersed are fully submersed for a short period of 20 to 60 minutes in an aqueous solution made of a hydroxide salt (MOH) at a pH above 10, preferably 11 and yet more preferably above 11.5, wherein M is an alkali metal cation and further of removing the aqueous hydroxide salt (MOH) solution.
- a process of rinse washing the pulse seeds or pulse seeds and seed coats with water or immersing in water for a short period of 30 to 180 minutes a temperature between 2° and 65° C.
- a process of homogenizing the pulse mass from the previous steps with a natural oil and water into an emulsion.
- a process of fermenting the emulsion with an added vegan ferment culture and, optionally, a vegan culture starter medium.

Statement 2° A method according to statement 1°, of manufacturing acidic fermented colloidal dispersions or suspensions from a pulse selected from the group consisting of chickpea (C. arietinum), yellow pea (P. sativum), common bean (P. vulgaris) and fava bean (V. faba), or a combination thereof, the method comprising subjecting the pulses to:
- a process in which dry pulses are submersed for at least 30 minutes in the bicarbonate solution or bicarbonate/carbonate solution at a temperature in the range of 40 to 70° C., preferably 55-65° C. and the solute has a pH lower than 10 and preferably above 7 or for a short period of 15 to 30 minutes at a temperature in the range of 70° C. to 90° C., preferably 80-90° C. and the solute has a pH lower than 10 and preferably above 7.
- a process of removing the aqueous bicarbonate salt solution with pulse flavor and off-tones from the pulse seeds or pulse seeds and seed coats.
- optionally, a process in which the pulse seeds or the pulse seeds and seed coats are immersed (are fully submersed) for a short period of 20 to 60 minutes in an aqueous solution made of a hydroxide salt (MOH) at a pH above 10, preferably 11 and yet more preferably above 11.5, wherein M is an alkali metal cation and further of removing the aqueous hydroxide salt (MOH) solution.
- a process of rinse washing the pulse seeds or pulse seeds and seed coats with water or immersing in water for a short period of 30 to 180 minutes at a temperature between 2° and 65° C.
- a process of homogenizing the pulse mass from the previous steps with a natural oil and water into an emulsion.
- a process of fermenting the emulsion with an added vegan ferment culture and, optionally, a vegan culture starter medium.

Statement 3° A method according to statement 1° or 2° of manufacturing acidic fermented colloidal dispersions or suspensions from a pulse selected from the group consisting of chickpea (C. arietinum), yellow pea (P. sativum), common bean (P. vulgaris) and fava bean (V. faba), or a combination thereof, the method comprising subjecting the pulses to:
- a process in which dry pulses are for a period of time of 20 to 3 hours, preferably for a period of 30 to 3 hours and this at a temperature of 55° C. to 65° C., or for a period in the range of 1 to 12 hours at a low temperature between 40° C. and 60° C. immersed or are fully submersed in an aqueous bicarbonate solution or bicarbonate/carbonate solution made of bicarbonate salt ($MHCO_3$), of bicarbonate salt and carbonate salt ($M_2CO_3$), or of bicarbonate salt and hydroxide salt (MOH), wherein M is an alkali metal cation, and with a pH between pH 7 and 10, preferably between 7.5 and 10.
- a process of removing the aqueous bicarbonate salt solution with pulse flavor and off-tones from the pulse seeds or pulse seeds and seed coats.
- optionally, a process in which the pulse seeds or the pulse seeds and seed coats are immersed or are fully submersed for a short period of 20 to 60 minutes in an aqueous solution made of a hydroxide salt (MOH) at a pH above 10, preferably 11, and yet more preferably above 11.5, wherein M is an alkali metal cation and further of removing the aqueous hydroxide salt (MOH) solution.
- a process of rinse washing the pulse seeds or pulse seeds and seed coats with water or immersing in water for a short period of 30 to 180 minutes at a temperature between 2° and 65° C.
- a process of homogenizing the pulse mass from the previous steps with a natural oil and water into an emulsion.
- a process of fermenting the emulsion with an added vegan ferment culture and, optionally, a vegan culture starter medium.

Statement 4° The method of any one of statements 1° to 3°, whereby aqueous bicarbonate solution or bicarbonate/carbonate solution is provided with a salt or an oxide of any one of the bivalent ions of the group consisting of $Ca^{++}$, $Fe_{++}$, $Mg^{++}$, $Zn^{++}$.

Statement 5° The method of any one of statements 1° to 4°, wherein the pH of the bicarbonate solution or bicarbonate/carbonate solution or the dose of the bivalent ions in the bicarbonate solution or bicarbonate/carbonate solution is used to regulate the texture of the fermented mass.

Statement 6° The method of any one of statements 1° to 5°, wherein the vegan ferment starter culture is a lactic acid bacteria (LAB) starter culture and, optionally, any one fermentation starter culture of the groups consisting of a bifidobacteria, a food yeast and a food mold or combination thereof.

Statement 7° The method of any one of statements 1° to 6°, wherein the lactic acid bacteria (LAB) is selected from the group consisting of *Lactobacillus acidophilus, Lactobacillus bulgaricus, Lactobacillus casei, Lactobacillus delbrueckii* subsp. *Bulgaricus, Lactobacillus helveticus, Lactobacillus paracasei, Lactobacillus plantarum, Lactobacillus rhamnosus, Lactococcus lactis* (and its subspecies, optionally, *Lactococcus lactis* subsp. *Cremoris, Lactococcus lactis* subsp. Diacetylactis or *Lactococcus lactis* subsp. *Lactis*), *Leuconostoc mesenteroide* and *Streptococcus thermophiles*, or a combination thereof.

Statement 8° The method of any one of statements 1° to 7°, wherein the bifidobacteria is selected from the group consisting of *Bifidobacterium animalis* spp. *Lactis, Bifidobacterium bifidum, Bifidobacterium lactis* and *Bifidobacterium breve*, or a combination thereof.

Statement 9° The method of any one of statements 1° to 8°, wherein the food yeast is *S. cerevisiae*.

Statement 10° The method of any one of statements 1° to 9°, wherein the food mold is *Aspergillus oryzae*.

Statement 11° The method of any one of statements 1° to 10°, wherein the aqueous bicarbonate solution or bicarbonate/carbonate solution comprising additionally $CaCl_2$) to prevent or inhibit material loss from the pulses under treatment in the solution.

Statement 12° A fermented vegan food, manufactured by the method of any one of statements 1° to 11°.

In view of the foregoing discussion, the examples, figures and following discussion, the application also provides aspects and statements as set forth in the following Statements ($1^\#$ to $10^\#$) directly below:

Statement $1^\#$ A method for eliminating unwanted accompanying fragrance and/or flavor of Fabaceae pulses, in particular, pulses selected from the group consisting of chickpea, yellow pea, common bean, and fava bean as whole pulses (hulled or de-hulled pulses), as split pulses or as chopped solids thereof with a Feret diameter (Dmax) of 1 to 4 mm, or a combination thereof, the method comprising subjecting the pulses to:

a process in which dry pulses are submersed for at least 30 minutes in the bicarbonate solution or bicarbonate/carbonate solution at a temperature in the range of 40 to 70° C., preferably 55-65° C. or for a short period of 15 to 30 minutes at a temperature in the range of 70° C. to 90° C., preferably 80-90° C.

a process of removing the aqueous bicarbonate salt solution with pulse flavor and off-tones from the pulse seeds or from the pulse seeds and seed coats.

optionally, a process in which the pulse seeds or the pulse seeds and seed coats are immersed are fully submersed for a short period of 20 to 60 minutes in an aqueous solution made of a hydroxide salt (MOH) at a pH above 10, preferably 11 and yet more preferably above 11.5, wherein M is an alkali metal cation and further of removing the aqueous hydroxide salt (MOH) solution.

a process of rinse washing the pulse seeds or the pulse seeds and seed coats with water or immersing in water for a short period of 30 to 180 minutes a temperature between 2° and 65° C. or for a short period of 15 to 30 minutes at a temperature in the range of 70° C. to 90° C., preferably 80-90° C.

Statement $2^\#$ The method according to statement $1^\#$, whereby aqueous bicarbonate solution or bicarbonate/carbonate solution is provided with a salt or an oxide of any one of the bivalent ions of the group consisting of $Ca^{++}$, $Fe^{++}$, $Mg^{++}$, $Zn^{++}$.

Statement $3^\#$ The method of any one of statements $1^\#$ to $2^\#$, further comprising partial enzymatic digestion of the pulse material, for instance, by an enzyme of the group consisting of a cellulase, an amylase, a protease and/or a peptidase.

Statement $4^\#$ The method of any one of statements $1^\#$ to $3^\#$, further comprising a process of homogenizing the pulse mass from the previous steps with a watery solution into a colloidal dispersion.

Statement $5^\#$ The method of any one of statements $1^\#$ to $3^\#$, further comprising a process of homogenizing the pulse mass from the previous steps with a natural oil and water into an emulsion.

Statement $6^\#$ The method of any one of statements $1^\#$ to $5^\#$, further comprising a process of fermenting the emulsion with an added vegan ferment culture and, optionally, a vegan culture starter medium.

Statement $7^\#$ The method of any one of statements $1^\#$ to $6^\#$, further comprising a process of homogenizing the pulse mass from the previous steps in a beverage, a cheese analogue, or a yogurt analogue.

Statement $8^\#$ The method of any one of statements $1^\#$ to $5^\#$, further comprising a process of coagulating with a coagulant and separating a protein fraction from the watery solution.

Statement $9^\#$ The method of any one of statements $1^\#$ to $3^\#$, further comprising a process of drying the pulse material, a process of dry milling and air classification protein/fiber rich and a starch rich fraction.

Statement $10^\#$ The method according to statement $9^\#$, further comprising electrostatic separations of the protein/fiber fraction into a fiber rich and a protein rich fraction.

In view of the foregoing discussion, the examples, figures and following discussion, the application also provides aspects and statements as set forth in the following Statements ($1^{\#\#}$ to $15^{\#\#}$) directly below:

Statement $1^{\#\#}$ A method for preparing food or feed ingredient with improved properties, the method comprising subjecting Fabaceae pulses, in particular, pulses selected from the group consisting of chickpea (*C. arietinum*), yellow pea (*P. sativum*), common bean (*P. vulgaris*) and fava bean (*V. faba*) as whole pulses (hulled or de-hulled pulses), as split pulses or as chopped solids thereof with a Feret diameter (Dmax) of 1 to 4 mm, or a combination thereof, to:

a process in which dry pulses are submersed for at least 30 minutes in the bicarbonate solution or bicarbonate/carbonate solution at a temperature in the range of 40 to 70° C., preferably 55-65° C. or for a short period of 15 to 30 minutes at a temperature in the range of 70° C. to 90° C., preferably 80-90° C.

a process of removing the aqueous bicarbonate salt solution with pulse flavor and off-tones from the pulse seeds or from the pulse seeds and seed coats.

optionally, a process in which the pulse seeds or the pulse seeds and seed coats are immersed are fully submersed for a short period of 20 to 60 minutes in an aqueous solution made of a hydroxide salt (MOH) at a pH above 10, preferably 11 and yet more preferably above 11.5, wherein M is an alkali metal cation and further of removing the aqueous hydroxide salt (MOH) solution.

a process of rinse washing the pulse seeds or the pulse seeds and seed coats with water or immersing in water for a short period of 30 to 180 minutes a temperature between 2° and 65° C. or for a short period of 15 to 30 minutes at a temperature in the range of 70° C. to 90° C., preferably 80-90° C.

Statement 2$^{\#\#}$ The method according to statement 1$^{\#\#}$, whereby aqueous bicarbonate solution or bicarbonate/carbonate solution is provided with a salt or an oxide of any one of the bivalent ions of the group consisting of $Ca^{++}$, $Fe^{+++}$, $Mg^{++}$, $Zn^{++}$.

Statement 3$^{\#\#}$ The method according to statement 1$^{\#\#}$ or 2$^{\#\#}$, further comprising drying the bicarbonate modified pulse material.

Statement 4$^{\#\#}$ The method according to any of statements 1$^{\#\#}$ to 3$^{\#\#}$, wherein the improved property is elimination unwanted accompanying fragrance and/or flavor.

Statement 5$^{\#\#}$ The method according to any of statements 1$^{\#\#}$ to 3$^{\#\#}$, wherein the improved property is reduced pulse flavor.

Statement 6$^{\#\#}$ The method according to any of statements 1$^{\#\#}$ to 3$^{\#\#}$, wherein the improved property is stabilization of colloid dispersion in a watery solution of fat globules, solid particles and/or gas in a watery solute.

Statement 7$^{\#\#}$ The method according to any of statements 1$^{\#\#}$ to 3$^{\#\#}$, wherein the improved property is improving texture, taste, mouthfeel, or viscosity.

Statement 8$^{\#\#}$ The method according to any of statements 1$^{\#\#}$ to 3$^{\#}$, wherein the improved property is increasing smoothness.

Statement 9$^{\#\#}$ The method according to any of statements 1$^{\#\#}$ to 3$^{\#\#}$, wherein the improved property is increased gel-like structure with increased water binding, decreased viscosity, increased creaminess, decreased pulse flavor, decreased syneresis, increased smoothness, decreased astringency or decreased beany taste.

Statement 10$^{\#\#}$ The method according to any of statements 1$^{\#\#}$ to 9$^{\#\#}$, comprising partial enzymatic digestion of the pulse material, for instance, by an enzyme of the group consisting of a cellulase, an amylase, a protease and/or a peptidase.

Statement 11$^{\#\#}$ The method according to any of statements 1$^{\#\#}$ to 9$^{\#\#}$, comprising partial enzymatic digestion of the pulse material, for instance, by an enzyme of the group consisting of a cellulose an alpha-amylase, a gluco-amylase, a serine protease, a cysteine protease, sulfhydryl protease, an endopeptidase and exopeptidase or a mixture thereof.

Statement 12$^{\#\#}$ The method according to any of statements 1$^{\#\#}$ to 11$^{\#\#}$, further comprising mixing the bicarbonate modified pulse material with a lipid, oil or butter and, optionally, other food or food ingredients into a colloidal dispersion.

Statement 13$^{\#\#}$ The method according to any of statements 1$^{\#\#}$ to 11$^{\#\#}$, further comprising mixing the bicarbonate modified pulse material with a lipid, oil or butter and, optionally, other food or food ingredients into an emulsion.

Statement 14$^{\#\#}$ The method according to any of statements 1$^{\#\#}$ to 13$^{\#\#}$, wherein the improved property is a stable colloidal dispersion, for instance, emulsion, after acidifying.

Statement 15$^{\#\#}$ The method according to any of statements 1$^{\#\#}$ to 13$^{\#\#}$, further comprising acidifying the composition with an acid.

Statement 16$^{\#\#}$ The method according to any of statements 1$^{\#\#}$ to 15$^{\#\#}$, further comprising fermenting the composition with a vegan ferment.

EXAMPLES

Example 1

Whole pulse seeds: Whole pulse seeds were used. Whole pulse seed in this application means the complete pulse seed with the two cotyledons and embryos inside the protecting seed coat. Of such whole pulse seed processes had been carried out on chickpea (*C. arietinum*), yellow pea (*P. sativum*), common bean (*P. vulgaris*) and fava bean (*V. faba*), which all belong to the family of the Fabaceae. A general practice to prepare such dry whole pulse seeds with seed coat is by mechanical harvesting once in the field the pods have matured and dried on the plant and by threshing to release the whole pulse seeds. Thereafter, the whole pulse seeds can be further dried to reduce their moisture content to ensure better storage stability and they will be cleaned to remove any debris, dirt, or impurities, for instance, by passing the whole pulse seeds through screens and air blowers to remove foreign materials. And finally, they are packed.

BC medium treatment: A further processing step of the disclosure is a treatment with an aqueous 5% ($Na^+$ $HCO_3^-$) sodium bicarbonate solution (hereinafter "BC medium"). Each time a 350-gram amount of the dry whole pulse seed (complete pulse seed with the two cotyledons, embryos, and the protecting seed coat) was, after a water rinse, subjected to a submersion treatment in a BC medium at 60° C. At this temperature, a carbonic acid-bicarbonate-carbonate equilibrium can be expected of which the pK1 and pK2 values of carbonic acid typically at 60° C. are about 6.47 and 9.87, respectively ($H_2CO_3$ (aq)+$H_2O$ (l)$\leftrightarrows$$HCO_3^-$ (aq)+$H_3O^+$ (aq) (K1) $HCO_3^-$ (aq)+$H_2O$ (l)$\leftrightarrows$$CO_3^{2-}$ (aq)+$H_3O^+$ (aq) (K2)). Therefore, a 350-gram amount of such dry whole pulse seeds were weighed in the mixing bowl of a Vorwerk Thermomix® TM6® appliance (with intelligent heating and mixing system) and this was filled with the 5% sodium bicarbonate solution to about the max. fill line (2.2 liters). Thereafter, this mass was stirred for 99 minutes at a temperature of 60° C. at low speed (initially at a Thermomix® TM6® speed setting 2 (200 rpm) to prevent blocking, consequently at a Thermomix® TM6® speed 1.5, and a little later at Thermomix® TM6® speed 1 (100 rpm). After a second rinse pulse under a water stream, this BC medium treatment mixing operation (99 min. at 60° C.) was repeated by subjecting the pulse matter for a second time to a fresh aqueous BC medium at the same speed and temperature.

Figure 10:
FIG. 10 is a photographic display of chickpeas treated with medium 3.5% sodium bicarbonate (75 grams/1.5 L)+10 grams/1.5 L)+calcium chloride (5 grams/1.5 L): pH=7.7, according to Example 8. It displays seed coat, chickpea without seed coat (two cotyledons and embryos attached together but without seed coat) and some split chickpea material.
Figure 11A:
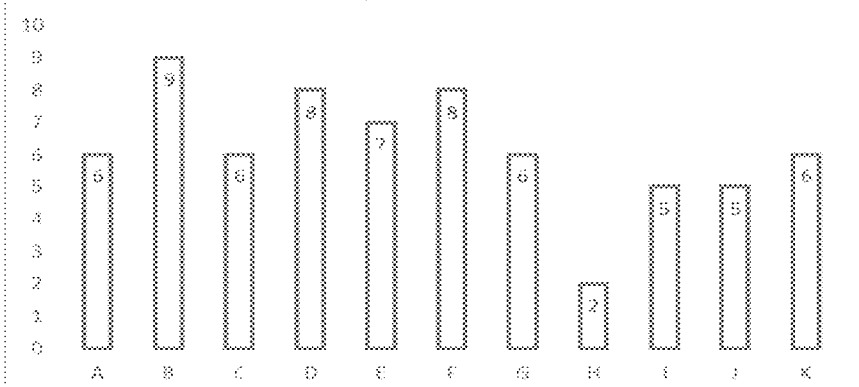
Figure 11B:
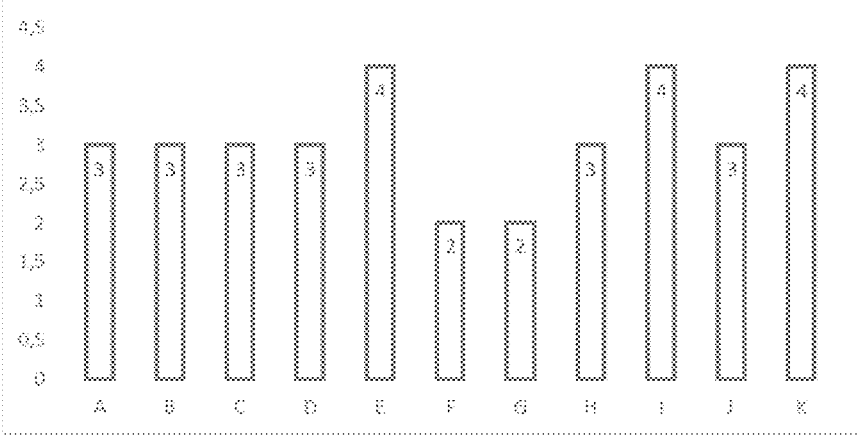
Figure 11C:
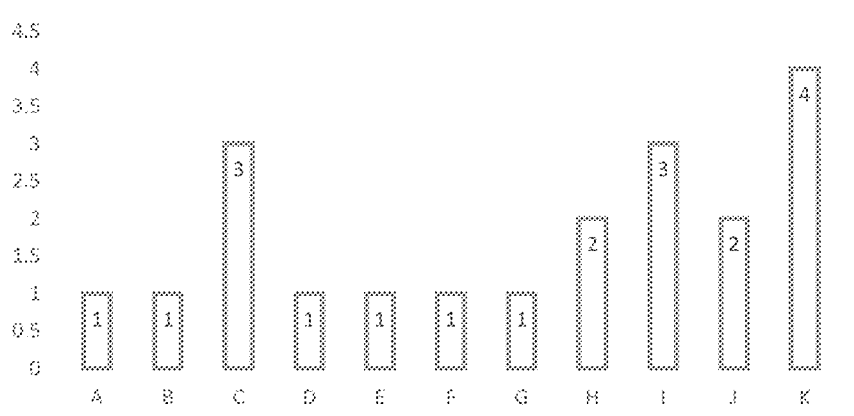
Figure 12:
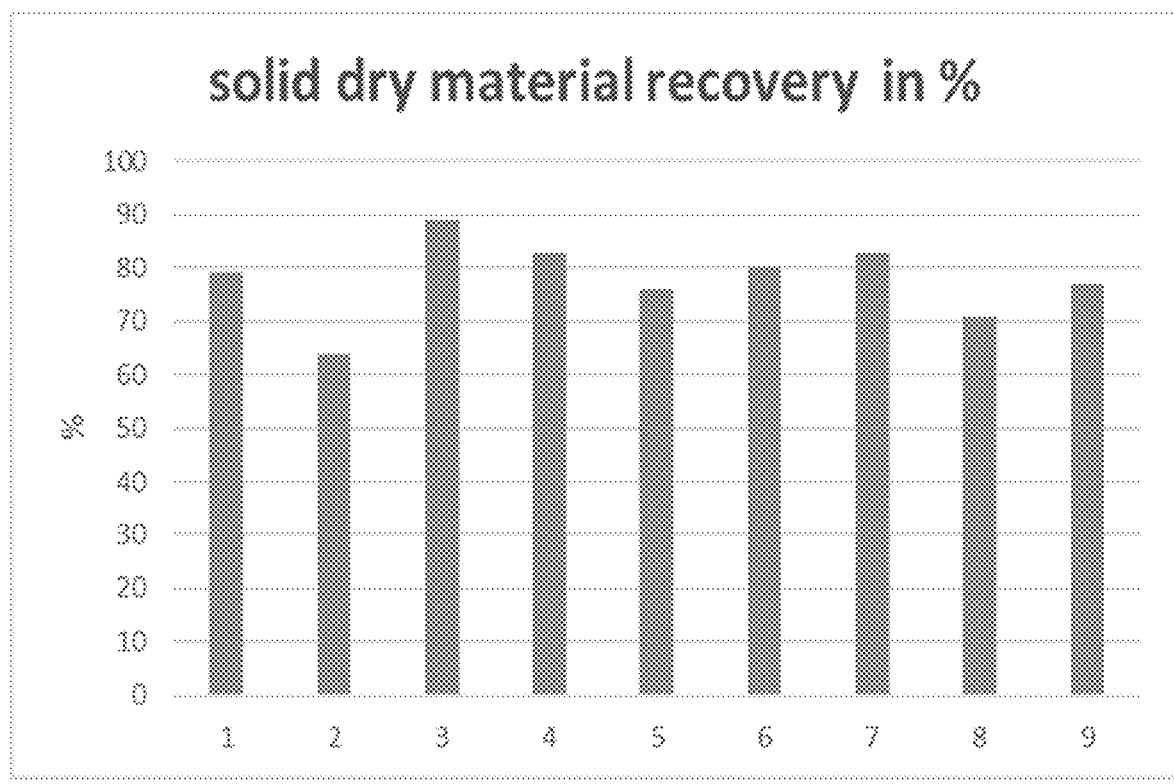
FIG. 12 is a graphic display that displays the solid pulse material recovery after the different treatment conditions of Example 8 (Table 3).

The BC medium was separated from the pulse matter and the pulse matter was subjected to a washing step each time by rinsing. Consequently, the same treatment was repeated as with the BC medium (2×99 minutes at 60° C.) but only in water without sodium bicarbonate. Finally, to guarantee full pasteurization, the pulse material was stirred in mixing bowl of a Vorwerk Thermomix® TM6® appliance for 20 minutes at 90° C. at low speed first at a Thermomix® TM6® speed setting 1 (100 rpm). The collected pulse matter is seed coat, the pulse without seed coat (two cotyledons and embryos attached together (but without seed coat) and some split pulse material (FIG. 10 for the NaHCO$_3$+CaCl$_2$ treatment).

Example 2

BC-BivCa medium treatment: For further processing by an adapted carbonate medium of the disclosure, a 350-gram amount of dry whole pulses with seed coat were, after a water rinse, subjected to a treatment with an aqueous solution of 5% sodium bicarbonate (NaHCO$_3$) comprising the bivalent cations as 0.5% calcium carbonate (Ca$^{++}$CO$_3^{--}$), 0.1% magnesium chloride (Mg$_2^+$Cl$^{2--}$), 20 mg ferrous lactate (iron(II) lactate), Fe$^{++}$ (C$_3$H$_5$O$_3$)$^{-2}$ and 20 mg zinc oxide (Zn$^{++}$O$^{--}$), hereinafter, the so-called "bivalent cation treatment medium" or the "BC-BivCa medium." Therefore, the 350-gram amount of such dry whole pulses were weighed in the mixing bowl of a Vorwerk Thermomix TM6 with an intelligent heating and mixing system and further filled with the BC-BivCa medium to about the maximum fill line (2.2 liters) and mixed for 99 minutes at 60° C. at low speed, first at the TM6 Thermomix speed 2 (200 rpm), consequently at the TM6 Thermomix speed 1.5, and a little later at the TM6 Thermomix speed 1 (100 rpm).

After a second rinse of the pulse matter under a water stream, this BC-BivCa medium treatment mixing operation was repeated by submersing the pulse matter for a second time in the same volume of fresh the BC-BivCa medium and for 99 minutes stirring this at TM6 Thermomix speed 1 (100 rpm) and at same temperature of 60° C. Each time the BC-BivCa medium has been separated from the pulse matter and each time the pulse matter had been subjected to a washing step by a water rinse. Consequently the same treatment was repeated with the BC-BivCa medium (2×99 min. at 60° C.) at the TM6 Thermomix speed 1 (100 rpm), but with water without BC-BivCa medium.

And finally, the pulse material was stirred in a mixing bowl of a Vorwerk Thermomix TM6 for 20 min. at 90° C. at low speed first at TM6 Thermomix speed setting 1 (100 rpm). The collected pulse matter is seed coat, the pulse without seed coat (two cotyledons and embryos attached together but without seed coat) and some split pulse material (FIG. 10 for the NaHCO$_3$+CaCl$_2$) treatment).

Example 3

Fermentation of whole pulse matter: Batches of some of the pulse material of the BC medium treatment (Example 1) and of the BC-BivCa medium treatment (Example 2) have, as a mixed matter of de-hulled pulses and separated seed coat (without grinding or homogenizing), been suspended into a pasteurized 5% cane sugar watery solution in sterile and sealable glass jars. Once at room temperature these have inoculated with by 1) vegan yogurt starter culture (*Aspergillus oryzae, S. cerevisiae, Lactobacillus bulgaricus, Streptococcus thermophiles, Lactobacillus plantarum, Lactobacillus casei* and *Lactococcus lactis*), and 2) vegan kefir starter culture (*Lactococcus lactis* subsp. *lactis, Lactococcus lactis* subsp. *cremoris, Lactococcus lactis* subsp. *diacetylactis, Lactobacillus delbrueckii* subsp. *bulgaricus, Lactobacillus helveticus, Lactobacillus rhamnosus, Lactobacillus paracasei, Lactobacillus acidophilus, Streptococcus thermophilus, Bifidobacterium bifidum* and *Leuconostoc mesenteroides*), as well as by 3) sauerkraut starter culture (wild bacteria and yeasts). Consequently, the pulse matter had been anaerobically fermented at 22° C. The fermentation with vegan yogurt starter culture was 14 days and the fermentation with vegan kefir starter culture and with sauerkraut starter culture was 7 days.

Example 4

A whole pulse processing test was organized as displayed in FIG. 1:
  whole chickpeas-BC-BivCa medium treatment-vegan kefir starter culture fermentation;
  whole chickpeas-BC medium process-vegan kefir starter culture fermentation;
  whole chickpeas-BC medium-vegan yogurt starter culture fermentation;
  whole yellow pea pulse-BC-BivCa medium-vegan kefir starter culture fermentation;
  whole yellow peas BC medium-vegan kefir starter culture fermentation;
  whole common bean-BC medium-vegan kefir starter culture fermentation;
  whole fava beans-BC medium process-vegan kefir starter culture fermentation;
  whole chickpeas-BC-BivCa medium treatment-sauerkraut starter culture (wild bacteria and yeasts);
  whole chickpeas-BC medium process-sauerkraut starter culture (wild bacteria and yeasts);
  whole yellow pea pulse-BC-BivCa medium-sauerkraut starter culture (wild bacteria and yeasts);
  whole yellow peas BC medium-sauerkraut starter culture (wild bacteria and yeasts);
  whole common bean-BC medium-sauerkraut starter culture (wild bacteria and yeasts); and
  whole fava beans-BC medium process-sauerkraut starter culture (wild bacteria and yeasts).

Example 5

Effect of the BC Medium Re-Treatment and the BC-BivCa Medium Treatment

The whole pulse matter was collected from the BC medium re-treatment and the BC-BivCa medium treatment and compared on consistency and mouthfeel.

BC medium re-treatment removed the plants tones and bitterness and earthiness tones of fava beans and common beans and rendered them a neutral taste. Both the BC medium re-treatment and the BC-BivCa medium treatment substantially removed the plant flavors and bitterness and earthiness tones from yellow peas and chickpeas.

Although the physical treatment conditions and treatment time was the same, a surprising observation is a difference in technical effect is that the chickpeas and the yellow peas treated with the BC medium (aqueous 5% NaHCO$_3$) had a remarkably more tender texture (Table 4) than respectively the chickpeas or the yellow peas treated with the BC-BivCa medium (an aqueous solution of 5% NaHCO$_3$ and the bivalent cations as 0.5% calcium carbonate, 0.1% magnesium chloride, 20 mg ferrous lactate (iron(II) lactate), Fe$^{++}$ (C$_3$H$_5$O$_3$)$^-_2$ and 20 mg zinc oxide (Zn$^{++}$O$^{--}$)).

A pulse material from a BC-BivCa medium treatment and of a BC medium treatment was freeze-dried. The resulting dry product provides nice neutral tasting pieces that can be consumed as pulse-based dry snack light pieces with a soft bite and agreeable mouthfeel that can be eaten as such or as a breakfast cereal analogue or a pulse-based instant cereal analogue, typically eaten for breakfast, often with milk or yogurt. Examples include corn flakes, oat bran flakes, puffed cereals, and muesli. The pieces can be fortified by any savory or sweet taste aroma and flavor. These dry products are particularly suitable as crunchy toppings for yogurt, ice cream, or desserts or to crunchy texture for salads or soups.

Example 6

Batches of chickpea pulse material from the BC medium treatment (Example 1) and from the BC-BivCa medium treatment (Example 2) have as a mixed matter of de-hulled pulses and separated seed coat (without grinding or homogenizing) been suspended into a pasteurized 5% cane sugar watery solution in sterile and sealable glass jars. Once at room temperature these have inoculated with 1) vegan yogurt starter culture, 2) vegan kefir starter culture and 2) sauerkraut starter culture. Consequently, the whole chickpea pulse matter had been anaerobically fermented at 22° C. for two weeks.

Both BC medium pretreated and BC-BivCa medium pretreated pulse material were fermented. Surprisingly, while the pulse texture of chickpeas after BC-BivCa medium treatment (Example 2) was firmer than for the pulse texture of the BC medium treatment (Example 1, Table 4)), after fermentation of this intact pulse subject matter by 1) vegan yogurt starter culture (*A. oryzae, S. cerevisiae, L. bulgaricus, S. thermophiles, L. plantarum, L. casei* and *L. lactis*), 2) vegan kefir starter culture (*L. lactis* subsp. *lactis, L. lactis* subsp. *cremoris, L. lactis* subsp. *diacetylactis, L. delbrueckii* subsp. *bulgaricus, L. helveticus, L. rhamnosus, L. paracasei, L. acidophilus, S. thermophilus, B. bifidum,* and *mesenteroides*) and by 3) sauerkraut starter culture (wild bacteria and yeasts), the pulse texture was substantially firmer for the chickpea pulse matter that was pretreated by BC medium treatment (Example 1) than for the BC-BivCa medium pre-treated chickpea pulse matter Example 2).

This fermented pulse chickpea subject matter was separated from the liquid medium over a mesh sieve and consisted of pulse seed and separated seed coats. This subject matter had been freeze-dried.

Both BC medium pretreated and also the BC-BivCa medium pretreated pulse material that was fermented by the sauerkraut starter was experienced to taste too sharp tart and tangy, funky with a wide range of flavors resembling that sauerkraut flavor. These unfamiliar notes were not really appreciated.

The BC medium pretreated pulse material that by the vegan yogurt starter had been dried and as a dry matter with tender bite been subjected to panel tasting. The overall impression was a product with a light, airy, and crispy texture with a balanced combination of lactic acid tanginess and subtle sweetness and furthermore versatile with a neutral taste profile allowing it to be rendered with savory, sweet as well as fruity flavors.

Both BC medium pretreated and the BC-BivCa medium pretreated pulse material fermented by the vegan kefir starter had been freeze dried. The dry material was subjected to panel testing for mouthfeel and taste. Both groups had a light, airy, and crispy texture and the overall taste impression was a product that was only slightly sour with a mild and refreshing tart (milder than for the vegan yogurt culture fermentation) and a pleasant tanginess.

Example 7

One batch of chickpea pulse material of the BC medium treatment (Example 1) was homogenized in pasteurized water 5% cane sugar water and was inoculated at room temperature with the vegan kefir starter culture (*A. oryzae,*

*S. cerevisiae, L. bulgaricus, S. thermophiles, L. plantarum, L. casei* and *L. lactis*) and was consequently anaerobically fermented for two weeks at 22° C. reaching a pH of 3.55. This mass was homogenous "spoon (spoonable)" fermentation plant base product, with a yogurt texture and without plant flavor of plant off tone. The fermentation did not result in coagulation.

Part of the fermented product had in Thermomix been pasteurized by subjecting it in the mixing bowl of a Vorwerk Thermomix TM6 for 30 min. to a temperature of 90° C. while mixing. This delivered a white homogenous mass that, after refrigeration at 4° C. for 7 days, remained homogenized and did not show any signs of separation of liquid by product.

Figure 9:
FIG. 9 is a photographic display of a living ferment chickpea yogurt reconstituted with pasteurized water from an instant powder stored under refrigeration.
Figure 9:
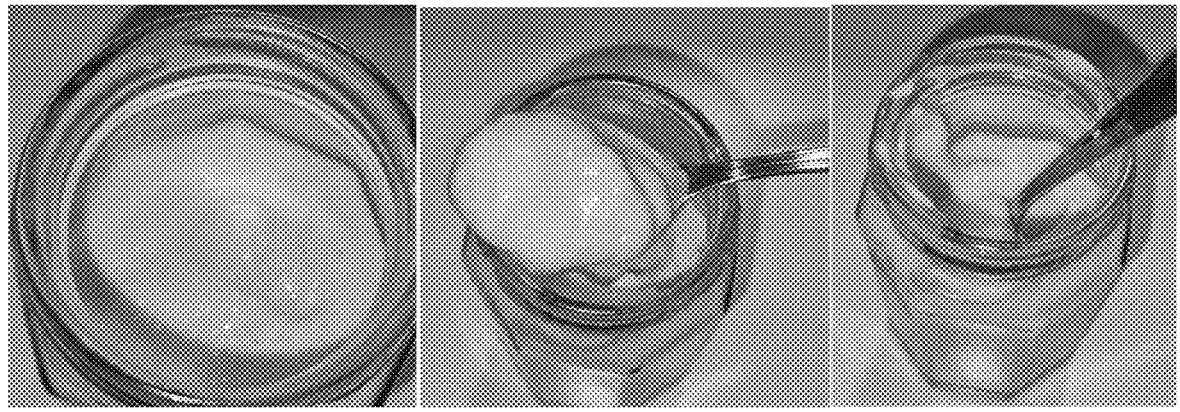

Part of the fermented product mixed with a 10% canola oil and a 5% rice syrup was homogenized in a sterile mixing bowl of the Vorwerk Thermomix TM6 at a speed setting 10 (10,200 rpm) for 5 min. and at a speed 6 (3,100 rpm) for 5 minutes. Since the typical chickpea plant taste tones were well removed, the product resembled a smooth dairy yogurt with smooth mouthfeel and similar lactic acid feel. This product was stored for 4 days at 4° C. without any signs of separation of liquid by product and further for 38 days at 4° C. remained a homogenous spoonable soft gelled-like solid with only some limited separation of liquid at the bottom of the jar (FIG. 9). Part of this product (fermented product mixed with a 10% canola oil and a 5% rice syrup) had been freeze dried and the dry product was consequently as dry product (the pulses and separate seed coats) been dry grinded or micronized in the mixing bowl of a Vorwerk Thermomix TM6 for 10 min. at speed setting 10 (10,200 rpm).

By adding water and mixing in the mixing bowel of a Vorwerk Thermomix TM6 at a speed 6 (3,100 rpm) for 5 min. this could be reconstituted instantly in a yogurt analogue with the same mouthfeel and lactic acid/citric acid tanginess as a dairy yogurt (FIG. 9). The texture after 38 days was firm/set, like a Greek yogurt strained for a longer time, the taste was fruity and smooth without mouth feel of fibers or particles and taste was moderately sour (lactic and citric acid-like), tasty and with nice aroma providing a dairy feel. The plant flavor and off tones are totally absent.

Example 8

This test on chickpea involved two fermentation conditions: group A, a vegan yogurt starter culture (*A. oryzae, S. cerevisiae, L. bulgaricus, S. thermophiles, L. plantarum, L. casei,* and *L. lactis*) and group B, vegan kefir starter culture+a vegan yogurt starter with (*L. lactis* subsp. *lactis, L. lactis* subsp. *cremoris, L. lactis* subsp. *diacetylactis, L. delbrueckii* subsp. *bulgaricus, L. helveticus, L. rhamnosus, L. paracasei, L. acidophilus, S. thermophilus, B. bifidum, L. mesenteroides* and *B. animalis* spp. *Lactis*).

Before fermentation, a pre-processing whole pulse seed had been carried out on chickpea (*C. arietinum*), which all belong to the family of the Fabaceae. A general practice to prepare such dry whole pulse seeds with seed coat is by mechanical harvesting. Once in the field, the pods mature and dry on the plant and are threshed to release the whole pulse seeds. Thereafter, the whole pulse seeds are further dried to reduce their moisture content to ensure better storage stability and they are cleaned to remove any debris, dirt, or impurities, for instance, by passing the whole pulse seeds through screens and air blowers to remove foreign materials. Finally, they are packed. For these dry chickpeas, each time 350 grams had been subjected by immersion to a different solution (numbered 1-9) and with washing steps.

The different solutions tested are:
1) 5% sodium bicarbonate (75 grams/1.5 L)+15 grams/1.5 L calcium lactate ($C_6H_{10}CaO_6$): pH=7.8.
2) 5% sodium bicarbonate (75 grams/1.5 L)+15 grams/1.5 L $Na^+OH^-$: pH=9.5.
3) 5% sodium bicarbonate (75 grams/1.5 L)+10 grams/1.5 L)+calcium chloride (5 grams/1.5 L): pH=7.7.
4) 5% sodium bicarbonate (75 grams/1.5 L)+15 grams/1.5 L calcium sulfate: pH=7.6.
5) 5% sodium bicarbonate (75 grams/1.5 L)+15 grams/1.5 L calcium carbonate: pH=8.1.
6) 5% sodium bicarbonate (75 grams/1.5 L)+15 grams/1.5 L additional 5% sodium bicarbonate: pH=8.1.
7) 5% sodium bicarbonate (75 grams/1.5 L)+15 grams/1.5 L magnesium chloride: pH=8.2.
8) 5% sodium bicarbonate (75 grams/1.5 L)+20 mg ferrous lactate (iron(II) lactate), and 20 mg zinc oxide ($Zn^{++}+O^{--}$): pH=8.2.
9) 5% sodium bicarbonate (75 grams/1.5 L)+4.5 grams/1.5 L calcium carbonate ($Ca^{++}CO_3^{--}$)+4.5 grams/1.5 L calcium sulfate+4.5 grams/1.5 L $Mg_2+Cl_2^{--}$+20 mg ferrous lactate (iron(II) lactate), and 20 mg zinc oxide ($Zn^{++}+O^{--}$): pH=7.7.

The processing step was a treatment with an aqueous solution. Each time a 350-gram amount of the dry whole pulse seed (complete pulse seed with the two cotyledons and embryos and the protecting seed coat) was, after a water rinse, subjected to a treatment of stirring in 1.5 L of the aqueous solution (medium 1, 2, 3, 4, 5, 6, 7, 8 or 9) at 60° C. Therefore, a 350-gram amount of such dry whole chickpeas were weighed in the mixing bowl of a Vorwerk Thermomix TM6 (with intelligent heating and mixing system) and this was filled with the solution. Thereafter, this mass was stirred during 99 min. at a temperature of 60° C. at low speed (initially at a TM6 Thermomix speed setting 2 (200 rpm) to prevent blocking, consequently at a TM6 Thermomix speed 1.5 and a little later at TM6 Thermomix speed 1 (100 rpm)). After a second rinse (pulse matter under a water stream), such aqueous solution treatment mixing operation (99 min. at a temperature of 60° C.) has been repeated by subjecting the chickpea matter for a second time with the same fresh aqueous solution at the same speed and temperature.

The aqueous solution had been separated from the chickpea matter and each time the chickpea matter had been subjected to a washing step by rinsing. Consequently, the same treatment has been repeated as with the same aqueous solution (2×99 min. at 60° C.) but only in water without the solutes. Finally, the chickpea material was stirred in a mixing bowl of a Vorwerk Thermomix TM6 in water for 20 min. at 90° C. at low speed first at a TM6 Thermomix speed setting 1 (100 rpm). The collected chickpea matter is seed coat, the chickpea without seed coat (two cotyledons and embryos attached together but without seed coat) and some split chickpea material (FIG. 10).

Tables

Table 1 displays an observation on the different wet pulse materials that were the different medium pre-treatment and thereafter that were subject to one-week anaerobic fermentation at 22° C. for one week.

TABLE 1

| Moist pulse before drying | pre-treatment | ferment | Firmness | Taste | pulse tone | Aroma |
|---|---|---|---|---|---|---|
| yellow pea | BC medium | vegan kefir starter | Medium | only slightly sour with a mild and refreshing tart | No | pleasant |
| yellow pea | BC-BicCa medium | vegan kefir starter | Soft | only slightly sour with a mild and refreshing tart | No | pleasant |
| yellow pea | BC medium | sauerkraut starter | Medium | unpleasant: taste too sharp tart and tangy, funky resembling that sauerkraut flavor | No | unpleasant |
| yellow pea | BC-BicCa medium | sauerkraut starter | Soft | unpleasant: taste too sharp tart and tangy, funky resembling that sauerkraut flavor | No | unpleasant |
| chickpea | BC medium | vegan kefir starter | medium | only slightly sour with a mild and refreshing tart | No | pleasant |

TABLE 1-continued

| Moist pulse before drying | pre-treatment | ferment | Firmness | Taste | pulse tone | Aroma |
|---|---|---|---|---|---|---|
| chickpea | BC-BicCa medium | vegan kefir starter | Soft | only slightly sour with a mild and refreshing tart | No | pleasant |
| chickpea | BC medium | vegan yogurt starter | medium | Pleasant tanginess citric and lactic acid-like | No | distinct and pleasant |
| Fava/Faba | BC medium | vegan kefir starter | Soft | only slightly sour with a mild and refreshing tart | No | very pleasant |
| Fava/Faba | BC medium | sauerkraut starter | medium | tart and tangy but less than for chickpea | No | unpleasant |
| Common bean | BC medium | vegan kefir starter | medium | only slightly sour with a mild and refreshing tart | No | pleasant |
| Common bean | BC medium | sauerkraut starter | soft (seed coats: medium) | tart and tangy but less than for chickpea | No | unpleasant |

Table 2 displays texture and taste/aroma features of chickpea (*C. arietinum*), yellow pea (*P. sativum*), common bean (*P. vulgaris*) and fava bean (*V. faba*), that were pretreated by the BC medium treatment or the BC-BivCa medium treatment according to Example 2 that were subjected as whole pulses to fermentation by I) the vegan yogurt starter culture (*A. oryzae, S. cerevisiae, L. bulgaricus, S. thermophiles, L. plantarum, L. casei* and *L. lactis*) or II) the vegan kefir starter culture (*L. lactis* subsp. *lactis, L. lactis* subsp. *cremoris, L. lactis* subsp. *diacetylactis, L. delbrueckii* subsp. *bulgaricus, L. helveticus, L. rhamnosus, L. paracasei, L. acidophilus, S. thermophilus, B. bifidum* and *L. mesenteroides*) according to Example 2. Groups evaluated in this dried whole pulse test are: A. whole yellow peas BC medium-vegan kefir starter culture fermentation; B. whole yellow pea pulse-BC-BivCa medium-vegan kefir starter culture fermentation; C. whole chickpeas-BC-BivCa medium treatment-vegan kefir starter culture fermentation; D. whole chickpeas-BC medium process-vegan kefir starter culture fermentation; E. whole chickpeas-BC medium-vegan yogurt starter culture fermentation; F. whole fava beans-BC medium process-vegan kefir starter culture fermentation; G. whole common bean-BC medium-vegan kefir starter culture fermentation; H. puffed buckwheat (Udea Holding B.V.); I. Puffed *quinoa* (Udea Holding B.V.); J. Puffed rice (Céréco Société par actions simplifiée); and K. Puffed Oats Unsweetened Organic (Udea Holding B.V.)

TABLE 2

| | Dried pulse | pre-treatment | ferment | Self-Disintegrating in mouth on scale 1-9 * | Taste intensity Scale 1-5 ** | Plant tone Scale 1-5 *** | Taste specification | Mouthfeel |
|---|---|---|---|---|---|---|---|---|
| A | yellow pea | BC medium | vegan kefir starter (II) | 6 | 3 | 1 | Cheesy, sweet | Initial dry than becomes creamy |
| B | yellow pea | BC-BicCa medium | vegan kefir starter (II) | 9 | 3 | 1 | Buttery, cheesy, kefir-like | creamy |
| C | chickpea | BC medium | vegan kefir starter (II) | 6 | 3 | 3 | Sweet, slightly acid | Dry than creamy |
| D | chickpea | BC-BicCa medium | vegan kefir starter (II) | 8 | 3 | 1 | Cheesy, buttery, little sour, Kefir-like | Creamy, not dry |
| E | chickpea | BC medium | vegan yogurt starter (I) | 7 | 4 | 1 | Acid and sweet | creamy |

TABLE 2-continued

| | Dried pulse | pre-treatment | ferment | Self-Disintegrating in mouth on scale 1-9 * | Taste intensity Scale 1-5 ** | Plant tone Scale 1-5 *** | Taste specification | Mouthfeel |
|---|---|---|---|---|---|---|---|---|
| F | Fava/Faba | BC medium | vegan kefir starter (II) | 8 | 2 | 1 | Cheesy, sweet, buttery | creamy |
| G | Common bean | BC medium | vegan kefir starter (II) | 6 | 2 | 1 | Light sweet, light acid | Dry than creamy |
| H | Puffed buckwheat | puffing | — | 2 | 3 | 2 | Buckwheat plant tone, roasted, sweet | Dry |
| I | Puffed quinoa | puffing | — | 5 | 4 | 3 | Slightly bitter and quinoa plant tone | Dry than creamy |
| J | Puffed rice | puffing | — | 5 | 3 | 2 | Sweet - slight rice plant tone | Dry than creamy |
| K | Puffed oat | puffing | — | 6 | 4 | 4 | Concentrated oat flavor, sweet, some bitterness | Dry than sticky |

Self-disintegrate in the mouth: (Rate on scale of 1-9) 1-9 * = 1 being slow and 9 being instantaneous.
Taste intensity Scale 1-5 ** Overall Flavor Intensity: 1) Very weak/2) Weak/3) Moderate/5) Strong/5) Very strong
Plant tone Scale 1-5 *** 1) No Plant-tones detected/2) Slight Plant-tone/3) Moderate Plant-tone/4) Strong Plant-tone/5) Overpowering Plant-tone

| | | pH | solid material recovery wet | solid material recovery Dry | solid dry material recovery % |
|---|---|---|---|---|---|
| 1 | $NaHCO_3$ + calcium lactate | 7.8 | 766 | 276.526 | 79 |
| 2 | $NaHCO_3$ + sodium hydroxide | 9.5 | 685 | 223.31 | 64 |
| 3 | $NaHCO_3$ + calcium chloride | 7.7 | 831 | 310.794 | 89 |
| 4 | $NaHCO_3$ + calcium sulfate | 7.6 | 799 | 290.836 | 83 |
| 5 | $NaHCO_3$ + calcium carbonate | 8.1 | 787 | 264.432 | 76 |
| 6 | $NaHCO_3$ | 8.1 | 815 | 278.73 | 80 |
| 7 | $NaHCO_3$ + magnesium chloride | 8.2 | 809 | 289.622 | 83 |
| 8 | $NaHCO_3$ + ferrous lactate + zinc oxide | 8.2 | 792 | 249.48 | 71 |
| 9 | sodium + calcium carbonate + calcium sulfate + magnesium chloride + ferrous lactate + zinc oxide | 7.7 | 827 | 269.602 | 77 |

Table 4 provides some pre-fermentation technical features as result of the different pre-treatment conditions Features observable on pre-treated wet chickpea matter of which the water has been leaked of through a 20 μm sieve.

1. Firm means that that the wet chickpea matter offers more resistance than tender-crisp, but still has a slight bite.
2. Tender-Crisp means that the wet chickpea matter has a light resistance to bite, retains its shape well.
3. Creamy means that the wet chickpea matter is smooth and yields easily to pressure, may start to break down slightly.
4. Mashing means that the wet chickpea matter easily breaks down with minimal pressure (ideal for dishes like hummus).

* For this homogenate texture test, 500 grams of chickpea each of the different (1-9) pre-treatments was, in a mixing bowl of the Vorwerk Thermomix TM6, joined with 982.5 grams water, 7.5 grams sugarcane sugar and 10 grams of canola oil. These were homogenized at a speed setting 10 (10,200 rpm) for 5 min. and at a speed 6 (3,100 rpm) for 5 minutes. 100 grams of each such substance was poured in a glass jar and sealed each for storage in refrigerator at 4° C.

Features observable on the cold stored (4° C.) chickpea matter homogenate:

Soupy/Runny means it is very thin and pourable, like drinking yogurt

Set/Wobbly: means it gels slightly but jiggles when disturbed.

Thick/Creamy means it is smooth and dense, offering mild resistance to a spoon.

Firm/Set means it holds its shape well, requires some pressure from a spoon.

TABLE 4

| | | Status of the chickpea + seed coat pH wet | Taste of the chickpea + seed coat wet | Texture Homogenized * and incubated for 24 hours at 4° C. * | Texture Homogenized * and incubated for 24 hours at 4° C. * |
|---|---|---|---|---|---|
| 1 | sodium bicarbonate + calcium lactate | 7.8 | tender-crisp | neutral | firm/set | like Greek yogurt strained for a longer time |
| 2 | sodium bicarbonate + sodium hydroxide | 9.5 | mashing | neutral | soupy/runny | drinking yogurt-like |
| 3 | sodium bicarbonate + calcium chloride | 7.7 | tender-crisp | neutral | thick/creamy | like Greek/Bulgarian yogurt |
| 4 | sodium bicarbonate + calcium sulfate | 7.6 | tender-crisp | neutral | firm/set | like Greek yogurt strained for a longer time |
| 5 | sodium bicarbonate + calcium carbonate | 8.1 | tender-crisp | neutral/nutty | thick/creamy | like Greek/Bulgarian yogurt |
| 6 | sodium bicarbonate | 8.1 | firm | neutral | thick/creamy | like Greek/Bulgarian yogurt |
| 7 | sodium bicarbonate + magnesium chloride | 8.2 | tender-crisp | neutral/nutty | set/wobbly but spoonable | custard yogurt/Quark or quarg-like/cottage cheese-like |
| 8 | sodium bicarbonate + ferrous lactate + zinc oxide | 8.2 | mashing | Tasty | thick/creamy | like Greek yogurt |
| 9 | sodium + calcium carbonate + calcium sulfate + magnesium chloride + ferrous lactate + zinc oxide | 7.7 | most firm | neutral | soupy/runny | drinking yogurt-like |

Table 5 displays texture and taste/aroma features of the different pretreatment groups 1 to 9 that were subjected to homogenization and fermentation. These technical features were observed on the whole chickpea pulsed that 1) had been treated with the different solutes (1-9) by the process of Example 8, consequently 2) were homogenate for each 500 grams of chickpea each of the different (1-9) pre-treatments was, in a mixing bowl of the Vorwerk Thermomix TM6, joined with 982.5 grams water, 7.5 grams sugarcane sugar and 10 grams of canola oil. These were homogenized at a speed setting 10 (10,200 rpm) for 5 min. and at a speed 6 (3,100 rpm) for 5 min. and consequently 3) such homogenate was inoculated with ferment culture group A or ferment culture group B (Example 8) for two weeks.

TABLE 5

| | | Ferment A Texture | Ferment A Texture | Ferment A Taste/aroma | Ferment B Texture | Ferment B Texture | Ferment B Taste/aroma |
|---|---|---|---|---|---|---|---|
| 1 | sodium bicarbonate + calcium lactate | firm/set | | like Greek yogurt strained for a longer time | Moderately sour | set/wobbly | custard yogurt/Quark or quarg-like/cottage cheese-like | Mildly sour |
| 2 | sodium bicarbonate + sodium hydroxide | soup/runny | | drinking yogurt-like | Moderately sour taste | soupy/running | drinking yogurt-like | Mildly sour Aroma less accepted |
| 3 | sodium bicarbonate + calcium chloride | thick/creamy | | like Greek/Bulgarian yogurt | Sharp/tangy sour taste | set/wobbly | custard yogurt/Quark or quarg-like/cottage cheese-like | Moderately sour Nice aroma |
| 4 | sodium bicarbonate + calcium sulfate | thick/creamy | | like Greek/Bulgarian yogurt | Highly sour/astringent Lactic acid feel | set/wobbly | custard yogurt/Quark or quarg-like/cottage cheese-like | Sharp/tangy sour |
| 5 | sodium bicarbonate + calcium carbonate | thick/creamy | | like Greek/Bulgarian yogurt | Moderately sour - resembling citric acid - fruity taste - fruity aroma | __lost__ | X | X |

TABLE 5-continued

| | | Ferment A Texture | Ferment A Texture | Ferment A Taste/aroma | Ferment B Texture | Ferment B Texture | Ferment B Taste/aroma |
|---|---|---|---|---|---|---|---|
| 6 | sodium bicarbonate | _lost_ | x | x | firm/set | like Greek yogurt strained for a longer time | Moderately sour taste; Nice aroma Dairy feel |
| 7 | sodium bicarbonate + magnesium chloride | thick/ creamy | like Greek/ Bulgarian yogurt | Highly sour/ astringent taste | set/ wobbly | custard yogurt/ Quark or quarg-like/ cottage cheese-like | Mildly sour Fruity Nice aroma |
| 8 | sodium bicarbonate + ferrous lactate + zinc oxide | thick/ creamy | like Greek/ Bulgarian yogurt | Sharp/tangy sour taste | set/ wobbly | custard yogurt/ Quark or quarg-like/ cottage cheese-like | Moderately sour Other taste sensation is neutral |
| 9 | sodium + calcium carbonate + calcium sulfate + magnesium chloride + ferrous lactate + zinc oxide | set/wobbly | custard yogurt/ Quark or quarg-like/ cottage cheese-like | Sharp/tangy sour Tastes well | set/ wobbly | custard yogurt/ Quark or quarg-like/ cottage cheese-like | Highly sour/astringent |

The terms in Table 5 have the following meanings:
1. Mildly sour means a subtle sourness barely noticeable on the tongue, resembling lightly flavored drink yogurt.
2. Moderately sour means a clear sour note, but still pleasant and refreshing, resembling standard plain yogurt.
3. Sharp/tangy sour means more intense sourness, might cause a slight pucker, resembling Greek yogurts.
4. Highly sour/astringent means very strong sourness with a noticeable drying or puckering sensation, resembling some Bulgarian yogurts or sour cream.

What is claimed is:

1. A method of manufacturing dry seed pulses, dry seed pulse halves, and/or dry seed pulse pieces having reduced fragrance and/or flavor accompanying the dry seed pulses, dry seed pulse halves, and/or dry seed pulse pieces, the method comprising:
   a) hydrating seed pulses, seed pulse halves, and/or seed pulse pieces in an aqueous bicarbonate solution or bicarbonate/carbonate solution by submersing and stirring the seed pulses, seed pulse halves, and/or seed pulse pieces in the bicarbonate solution or the bicarbonate/carbonate solution at a temperature of 40° C. to 90° C. to form hydrated seed pulses, hydrated seed pulse halves, and/or hydrated seed pulse pieces;
   b) removing the bicarbonate solution or the bicarbonate/carbonate solution from the hydrated seed pulses, hydrated seed pulse halves, and/or hydrated seed pulse pieces so as to form a pulse material comprising the seed pulses, seed pulse halves, and/or seed pulse pieces;
   c) washing the pulse material to form a washed pulse material;
   d) fermenting the washed pulse material with a lactic acid bacteria (LAB) starter culture; and
   e) drying the washed pulse material so as to form the dry seed pulses, dry seed pulse halves, and/or dry seed pulse pieces having reduced fragrance and/or flavor.

2. The method according to claim 1, wherein the seed pulses are hydrated by submersing them for at least 30 minutes in the bicarbonate solution or the bicarbonate/carbonate solution at a temperature of 40 to 70° C.

3. The method according to claim 1, wherein the seed pulses are selected from the group consisting of chickpea (*Cicer arietinum*), yellow pea (*Pisum sativum*), common bean (*Phaseolus vulgaris*) and fava bean (*Vicia faba*), and a combination of any thereof.

4. The method according to claim 1, wherein the LAB in the starter culture is selected from the group consisting of *Lactobacillus acidophilus, Lactobacillus bulgaricus, Lactobacillus casei, Lactobacillus delbrueckii* subsp. *Bulgaricus, Lactobacillus helveticus, Lactobacillus paracasei, Lactobacillus plantarum, Lactobacillus rhamnosus, Lactococcus lactis, Lactococcus lactis* subsp. *Cremoris, Lactococcus lactis* subsp. *Diacetylactis, Lactococcus lactis* subsp. *Lactis, Leuconostoc mesenteroide, Streptococcus thermophiles,* and a combination of any thereof.

5. The method according to claim 1, wherein a fermentation starter culture is included, wherein the fermentation starter culture comprises a Bifidobacteria selected from the group consisting of *Bifidobacterium animalis* spp. *Lactis, Bifidobacterium bifidum, Bifidobacterium lactis, Bifidobacterium breve,* and a combination of any thereof.

6. The method according to claim 1, wherein a fermentation starter culture is included in the method, wherein the fermentation starter culture comprises *Saccharomyces cerevisiae*.

7. The method according to claim 1, wherein a fermentation starter culture is included in the method, wherein the fermentation starter culture comprises *Aspergillus oryzae*.

8. The method according to claim 1, wherein the washed pulse material is fermented with the LAB starter culture in combination with a fermentation starter culture selected from the group consisting of a bifidobacteria, a food yeast, a food mold, and a combination of any thereof.

9. The method according to claim 2, wherein the seed pulses, seed pulse halves, and/or seed pulse pieces are hydrated by submersing and stirring the seed pulses, seed pulse halves, and/or seed pulse pieces in the bicarbonate solution or the bicarbonate/carbonate solution a first time for 99 minutes.

10. The method according to claim 9, wherein the seed pulses, seed pulse halves, and/or seed pulse pieces are hydrated by submersing and stirring the seed pulses, seed pulse halves, and/or seed pulse pieces in the bicarbonate solution or the bicarbonate/carbonate solution a second time for 99 minutes.

11. A method of manufacturing dry seed pulses, dry seed pulse halves, and/or dry seed pulse pieces, the method comprising:
  a) hydrating seed pulses, seed pulse halves, and/or seed pulse pieces in an aqueous bicarbonate solution or bicarbonate/carbonate solution wherein the seed pulses, seed pulse halves, and/or seed pulse pieces are hydrated by submersing them for 15 to 30 minutes at a temperature in a range of 70° C. to 90° C. in the bicarbonate solution or the bicarbonate/carbonate solution having a pH lower than 10 to form hydrated seed pulses, hydrated seed pulse halves, and/or hydrated seed pulse pieces;
  b) removing the bicarbonate solution or the bicarbonate/carbonate solution from the hydrated seed pulses, seed pulse halves, and/or seed pulse pieces so as to form a pulse material comprising the seed pulses, seed pulse halves, and/or seed pulse pieces;
  c) washing the pulse material to form a washed pulse material;
  d) fermenting the washed pulse material with a lactic acid bacteria (LAB) starter culture; and
  e) drying the washed pulse material so as to form the dry seed pulses, dry seed pulse halves, and/or dry seed pulse pieces.

12. The method according to claim 11, wherein the washed pulse material is fermented with the LAB starter culture in combination with a fermentation starter culture selected from the group consisting of a bifidobacteria, a food yeast, a food mold, and a combination of any thereof.

13. A method of manufacturing dry seed pulses, dry seed pulse halves, and/or dry seed pulse pieces, the method comprising:
  a) hydrating seed pulses, seed pulse halves, and/or seed pulse pieces in an aqueous bicarbonate solution or bicarbonate/carbonate solution, wherein the aqueous bicarbonate solution or the bicarbonate/carbonate solution comprises $CaCl_2$) so as to reduce material loss from the seed pulses under treatment in the aqueous bicarbonate solution or the bicarbonate/carbonate solution to form hydrated seed pulses, hydrated seed pulse halves, and/or hydrated seed pulse pieces;
  b) removing the bicarbonate solution or the bicarbonate/carbonate solution from the hydrated seed pulses, hydrated seed pulse halves, and/or hydrated seed pulse pieces so as to form a pulse material comprising the seed pulses, seed pulse halves, and/or seed pulse pieces;
  c) washing the pulse material to form a washed pulse material;
  d) fermenting the washed pulse material with a lactic acid bacteria (LAB) starter culture; and
  e) drying the washed pulse material so as to form the dry seed pulses, dry seed pulse halves, and/or dry seed pulse pieces.

14. The method according to claim 13, wherein the washed pulse material is fermented with the LAB starter culture in combination with a fermentation starter culture selected from the group consisting of a bifidobacteria, a food yeast, a food mold, and a combination of any thereof.

* * * * *